(12) United States Patent
Quintens

(10) Patent No.: US 7,498,125 B2
(45) Date of Patent: Mar. 3, 2009

(54) NON-TRANSPARENT MICROVOIDED BIAXIALLY STRETCHED FILM, PRODUCTION PROCESS THEREFOR AND PROCESS FOR OBTAINING A TRANSPARENT PATTERN THEREWITH

(75) Inventor: Dirk Quintens, Westerlo (BE)

(73) Assignee: Agfa-Gevaert N.V., Mortsel (BE)

( * ) Notice: Subject to any disclaimer, the term of this patent is extended or adjusted under 35 U.S.C. 154(b) by 0 days.

(21) Appl. No.: 11/866,112

(22) Filed: Oct. 2, 2007

(65) Prior Publication Data

US 2008/0096143 A1  Apr. 24, 2008

Related U.S. Application Data

(60) Provisional application No. 60/908,545, filed on Mar. 28, 2007, provisional application No. 60/908,542, filed on Mar. 28, 2007, provisional application No. 60/908,536, filed on Mar. 28, 2007, provisional application No. 60/908,526, filed on Mar. 28, 2007, provisional application No. 60/850,512, filed on Oct. 10, 2006, provisional application No. 60/850,511, filed on Oct. 10, 2006.

(30) Foreign Application Priority Data

| Oct. 3, 2006 | (EP) | ................................. 06121665 |
|---|---|---|
| Oct. 3, 2006 | (EP) | ................................. 06121669 |
| Mar. 27, 2007 | (EP) | ................................. 07104947 |
| Mar. 27, 2007 | (EP) | ................................. 07104948 |
| Mar. 27, 2007 | (EP) | ................................. 07104950 |
| Mar. 27, 2007 | (EP) | ................................. 07104953 |

(51) Int. Cl.
G03C 1/76 (2006.01)

(52) U.S. Cl. ....................... 430/536; 430/290; 430/346; 430/964; 428/315.5

(58) Field of Classification Search ................. 430/536, 430/290, 346, 964; 428/315.5
See application file for complete search history.

(56) References Cited

U.S. PATENT DOCUMENTS

| 3,755,499 | A |   | 8/1973 | Heijo |   |
|---|---|---|---|---|---|
| 4,128,689 | A |   | 12/1978 | Heaps et al. |   |
| 4,174,883 | A |   | 11/1979 | Imataki et al. |   |
| 4,187,113 | A | * | 2/1980 | Mathews et al. | ............ 430/533 |
| 4,243,769 | A |   | 1/1981 | Pritchett |   |
| 4,342,846 | A |   | 8/1982 | Silberberg |   |
| 4,942,005 | A | * | 7/1990 | Pollock et al. | ............. 264/45.3 |
| 6,703,193 | B1 |   | 3/2004 | Laney et al. |   |

FOREIGN PATENT DOCUMENTS

| EP | 0 436 178 A2 | 7/1991 |
|---|---|---|
| EP | 0 654 503 A2 | 11/1993 |

\* cited by examiner

*Primary Examiner*—Amanda C. Walke
(74) *Attorney, Agent, or Firm*—Leydig, Voit & Mayer, Ltd.

(57) ABSTRACT

A non-transparent microvoided biaxially stretched self-supporting non-laminated polymeric film, the film comprising linear polyester as a continuous phase and dispersed uniformly therein an amorphous high polymer with a higher glass transition temperature than the glass transition temperature of the continuous phase and/or a crystalline high polymer having a higher melting point than the glass transition temperature of said continuous phase, wherein said linear polyester consists essentially of aromatic dicarboxylate and aliphatic dimethylene monomer units; the polymeric film has an optical density measured in transmission with a visible filter; and at least 50% of the optical density is due to microvoids; the use of the non-transparent microvoided biaxially stretched film as a synthetic paper; an image recording element comprising the non-transparent microvoided biaxially stretched film; and a process for obtaining a transparent pattern therewith.

28 Claims, No Drawings

NON-TRANSPARENT MICROVOIDED BIAXIALLY STRETCHED FILM, PRODUCTION PROCESS THEREFOR AND PROCESS FOR OBTAINING A TRANSPARENT PATTERN THEREWITH

CROSS-REFERENCE TO RELATED PATENT APPLICATIONS

This application claims the benefit of U.S. Provisional Application No. 60/850,512 filed Oct. 10, 2006, U.S. Provisional Application No. 60/850,511 filed Oct. 10, 2006, U.S. Provisional Application No. 60/908,526 filed Mar. 28, 2007, U.S. Provisional Application No. 60/908,536 filed Mar. 28, 2007, U.S. Provisional Application No. 60/908,542 filed Mar. 28, 2007, U.S. Provisional Application No. 60/908,545 filed Mar. 28, 2007, all incorporated by reference.

In addition, this application claims the benefit of European Application No. 06121669.3 filed Oct. 3, 2006, European Application No. 06121665.1 filed Oct. 3, 2006, European Application No. 07104953.0 filed Mar. 27, 2007, European Application No. 07104947.2 filed Mar. 27, 2007, European Application No. 07104948.0 filed Mar. 27, 2007, and European Application No. 07104950.6 filed Mar. 27, 2007, which are all also incorporated by reference.

FIELD OF THE INVENTION

The present invention concerns non-transparent microvoided biaxially stretched films, a production process therefor, its use as a synthetic paper and image recording element comprising the films.

BACKGROUND OF THE INVENTION

U.S. Pat. No. 3,755,499 discloses a synthetic sheet for writing purposes which consists essentially of a linear polyester selected from the group consisting of polyethylene terephthalate, polyethylene isophthalate, and copolymers of ethylene terephthalate and ethylene isophthalate, and a high polymer having a higher glass transition point than that of said linear polyester at a mixing ration of from 7 to 35% by weight of the latter with respect to the polymer mixture, which high polymer is selected from the group consisting of a polymethylmethacrylate, a copolymer of acrylonitrile an styrene, a copolymer of acrylonitrile, butadiene and styrene, said synthetic sheet having a very finely coarsened surface due to said high polymer which is uniformly dispersed in said linear polyester to constitute the nuclei for the irregular surface thereof. Both simultaneous and sequential stretching of these mixed polymer materials are disclosed usually at 85 to 95° C. with stretching ratios from 2 to 3.5 times the original length, the sheet being adjusted for writability and opacity in conformity with its eventual use. The object of the invention of U.S. Pat. No. 3,755,499 is stated to be the provision of a synthetic sheet for writing and similar other purposes having improved surface condition, opacity, and other requisite properties. U.S. Pat. No. 3,755,499 further discloses that the thermoplastic resin to be mixed may or may not have compatibility with the linear polyester, provided that it can be substantially uniformly mixed with and dispersed in the linear polyester at the time of forming, that the formed film, regardless of whether it is transparent or not, may produce a uniform mat surface upon being stretched and the film thus obtained is heat-shrinkable, acceptable in its writing properties, and possesses adequate opacity and that in order to further improve stability in the film size at a high temperature, it may be heat-treated at a temperature above the stretching temperature of the linear polyester and below the melting point of both mixing thermoplastic resin and the linear polyester. EXAMPLE 2 exemplifies the mixing of a copolymer of acrylonitrile and styrene having a glass transition temperature of 100 to 105° C. with polyethylene terephthalate in concentrations of 7 and 35% by weight and the forming of 150 μm thick film samples by melt-extrusion through a T-die. These film sheets were then stretched simultaneously by a biaxial stretching machine at a stretch ratio twice as large as the original length of the film in the longitudinal as well as transverse directions thereof at 85° C. and also stretched simultaneously biaxially three times longitudinally and three times transversely at 85° C. The resulting films were reported to have the following properties:

| acrylonitrile-styrene copolymer (% by wt.) | 7 | 7 | 35 | 35 |
|---|---|---|---|---|
| Polyethylene terephthalate (% by wt.) | 93 | 93 | 65 | 65 |
| stretch ratio (L × W) times | 2 × 2 | 3 × 3 | 2 × 2 | 3 × 3 |
| thickness after stretching (μm) | 48 | 26 | 45 | 25 |
| rupture strength (kg/cm) | 880 | 1210 | 650 | 730 |
| elongation at Breaking Point (%) | 110 | 45 | 55 | 23 |
| light Transmission Factor (%) | 80.8 | 84.2 | 72.3 | 77.6 |
| haze value (%) | 92.5 | 90.6 | 94.3 | 96.6 |
| writability [pencil hardness] | ≦4H | ≦3H | ≦4H | ≦3H |

U.S. Pat. No. 3,755,499 fails to disclose the influence of addition of an inorganic opacifying pigment or of the imagewise heating on the opaque microvoided films disclosed therein.

U.S. Pat. No. 4,174,883 discloses a rear projection screen which comprises a light scattering member composed of a melted mixture consisting essentially of a dispersion medium polymer and a dispersed phase polymer dispersed therein, said melted mixture being obtained by melting and then mixing said polymers, wherein the absolute value of the difference between the refractive index of the dispersion medium polymer and the maximum refractive index of the dispersed phase polymer is from 0.01 to 0.25, and wherein the dispersion medium polymer is a member selected from high density polyethylene, low density polyethylene, polypropylene, 6,6-nylon, polyethylene terephthalate and polystyrene and the dispersed phase polymer is at least one member selected from the group consisting of high density polyethylene, low density polyethylene, polypropylene, polyethylene terephthalate, 6-nylon, 6,6-nylon, 6,10-nylon, polymethyl methacrylate, polymethyl acrylate, polyvinyl chloride resins, polyvinyl acetate resins, polyacetal resins, polystyrene, polycarbonates, nitrile rubber, neoprene rubber, chloroprene rubber, styrene-butadiene rubber, ethylene-vinyl acetate copolymers, and styrene acrylonitrile copolymers.

U.S. Pat. No. 4,128,689 discloses a process for preparing thermoplastic sheets or webs, which process comprises the steps of: (i) extruding a foamable thermoplastic polymer mixture through the die of a screw extruder to produce a foamed extrudate in sheet or web form, the foamable thermoplastic polymer mixture containing at least a first and a second thermoplastic polymer, the first thermoplastic polymer being substantially crystalline and having a higher melting point than, and being substantially immiscible with, the second thermoplastic polymer, and the temperature of extrusion being equal to or greater than the melting point of the first thermoplastic polymer; (ii) stretching the foamed extrudate from step (i) in the direction of extrusion as it leaves the die to rupture most of the cells of the foamed extrudate and to elongate the walls of the collapsed cells in the direction of stretch; (iii) compressing the stretched extrudate from step (ii) while it remains plastic; and (iv) cooling and foamed, stretched and compressed extrudate from step (iii). Furthermore, U.S. Pat. No. 4,128,689 discloses that the first thermoplastic polymer is preferably selected from high density polyethylene, polypropylene, polybutene-1, poly 4-methylpentene-1, polyethylene terephthalate, nylon 6, nylon 66 and nylon 11 and the second thermoplastic polymer is preferably a non-crystalline thermoplastic polymer preferably selected from cellulose acetate, cellulose propionate, cellulose acetate butyrate, ethyl cellulose, polystyrene, styrene-acrylonitrile copolymers, polycarbonates, styrene and methyl styrene copolymers and phenylene oxide polymers.

U.S. Pat. No. 4,243,769 discloses a method for providing a grossly homogeneous, permanently miscible mixture of polymers which has properties not evident in a simple blend of the polymers and which does not separate spontaneously into the component polymers, which comprises uniformly mixing (a) a polymer component containing a nitrile functionality with (b) a polymer component containing hydroxyl or esterified hydroxyl functional groups condensable with nitriles, said polymer components (a) and (b) tending to spontaneously separate from a simple blend thereof, in the presence of from about 0.001 to 8 percent by weight of the mixture of polymers and acid of an acid compatibilizing agent and for a period sufficient to provide the aforesaid permanently miscible mixture of polymers which, at ambient temperature, is in the form of a solid. Furthermore, U.S. Pat. No. 4,243,769 discloses that the nitrile group material is preferably selected from the group consisting of polyacrylonitrile, polymethacrylonitrile, methacrylonitrile-acrylonitrile-vinyl acetate terpolymer, styrene-acrylonitrile copolymer, acrylonitrile-acrylic ester copolymer, acrylonitrile-butadiene-styrene terpolymer, acrylonitrile-styrene-alpha methyl styrene terpolymer, nitrile rubber, polycaprolactam-acrylonitrile graft copolymer, polyethylene-acrylonitrile graft copolymer, polyethylene terephthalate-acrylonitrile graft copolymer, cyano-styrene-methylmethacrylate copolymer, acrylonitrile-methyl vinyl ether copolymer, methacrylonitrile-alpha methylstyrene copolymer, cyanoethylated cellulose, cyanoethylated polyvinyl alcohol, cyanoethylated polyamide, cyanoethylated polystyrene and cyanoethylated silicone polymer; and the chemically condensable material is preferably selected from the group consisting of polyvinyl alcohol, polyvinyl butyral containing unreacted alcohol groups, ethylene-vinyl acetate, saponified or partly saponified ethylene-vinyl acetate copolymers, ethylene-vinyl acetate-sulfur dioxide terpolymer, vinyl chloride-vinyl acetate, nylon grafted with vinyl acetate, polytetrafluoroethylene grafted with vinyl acetate, polyvinyl alcohol grafted with butylmethacrylate, vinyl acetate-isobutyl vinyl ether copolymer, styrene-allyl alcohol copolymer polyethylene adipate, styrenated polyester of maleic and phthalic acids with ethylene and propylene glycols, poly(ethylene terephthalate), cellulose, hydroxyethyl methacrylate copolymer, hydroxybutyl vinyl ether copolymer, hydroxyethyl methacrylamide copolymer, polyethylene glycol, hydroxyl terminated polystyrene, hydroxyl terminated polybutadiene, and hydroxyl terminated polyisoprene.

U.S. Pat. No. 4,342,846 discloses a blend comprising: (1) a polyester resin formed by reaction of a dicarboxylic acid and a diol, preferably poly(ethylene terephthalate); and (2) an impact resistant interpolymer comprising crosslinked (meth) acrylate, crosslinked styrene-acrylonitrile, and uncrosslinked styrene-acrylonitrile polymeric components.

EP 0 436 178A2 discloses a polymeric shaped article characterized in that said article is comprised of a continuous oriented polymer matrix having dispersed therein microbeads of a cross-linked polymer which are at least partially bordered by void space, said microbeads being present in an amount of 5-50% by weight based on the weight of said oriented polymer, said void space occupying 2-60% by volume of said article. EP 0 436 178A2 further discloses that said cross-linked polymer preferably comprises polymerizable organic material which is a member selected from the group consisting of an alkenyl aromatic compound having the general formula $Ar-C(-R)=CH_2$ wherein Ar represents an aromatic hydrocarbon radical, or an aromatic halohydrocarbon radical of the benzene series and R is hydrogen or the methyl radical; acrylate-type monomers including monomers of the formula $CH_2=C(-R')-C(-OR)=O$ wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula $CH_2=CH-O-C(-R)=O$ wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$, wherein n is a whole number within the range of 2-10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

EP-A 0 654 503 discloses a shaped article prepared from a polymer blend of 50 to 97 wt. % of a linear polyester and 3 to 50 wt. % of a polymer containing styrene e.g. a graft polymer of acrylonitrile, butadiene and styrene (ABS), a styrene-acrylonitrile copolymer or a high impact polystyrene (HIPS), wherein the percentages relate to the sum of the polyester and the polymer containing styrene. EP-A 0 654 503 further discloses that the support material according to the invention may contain further additives, for example pigments, in particular $TiO_2$, $BaSO_4$, $CaCO_3$, optical whiteners or blue dyes, which further increase covering power and improve sharpness, in particular 0.5 to 10 wt. %, related to the total weight of the constituent used, preferably 2 to 10, preferably 3.5 to 6.5 wt. % of $TiO_2$ pigment, preferably of the anatase type, are added.

U.S. Pat. No. 6,703,193 discloses an image recording element comprising a microvoided layer comprising a continuous phase polyester matrix having dispersed therein crosslinked organic microbeads and non-crosslinked polymer particles that are immiscible with the polyester matrix of said microvoided layer. U.S. Pat. No. 6,703,193 further discloses that if only non-crosslinked polymer particles that are immiscible with the polyester matrix are used in the microvoided layer of a silver halide display media the raw material and manufacturing cost is low, as a compounding step is not required, but the image sharpness is very poor due to the relatively large voids that result. Thus although the use of immiscible polymer particles as voiding agents in imaging media is attractive from a cost standpoint, the quality with respect to sharpness is prohibitively inferior. U.S. Pat. No. 6,703,193 also discloses that it has been unexpectedly discovered that by mixing both the crosslinked organic microbeads and the non-crosslinked polymer particles that are immiscible with polyester into the polyester matrix of the microvoided layer the deficiencies of the void initiators when used singularly are synergistically overcome, especially with respect to image quality and manufacturability. The combination of crosslinked organic beads and non-crosslinked polymer particles immiscible in a polyester matrix enjoys the quality, with respect to sharpness of microbead-voided media, without the expected degradation associated with the addition of a material with poor sharpness quality, with significant cost reductions and manufacturing time and effort reductions resulting from the need to use less costly raw material which in turn lowers the time and effort needed to compound microbeads with matrix polymer. U.S. Pat. No. 6,703,193 also discloses that the voided layer may contain white pigments which are known to improve the photographic responses such as whiteness or sharpness such as titanium dioxide, barium sulfate, clay, calcium carbonate or silica; and that addenda may be added to the layers to change the color of the imaging element. U.S. Pat. No. 6,703,193 fails to disclose the influence of image-wise heating on the opaque microvoided films disclosed therein.

The prior art non-transparent microvoided biaxially stretched film has suffered from insufficient opacity together with a lack of dimensional stability or sufficient dimensional stability and insufficient opacity. Moreover, for particular applications the whiteness of the non-transparent microvoided biaxially stretched film was insufficient.

ASPECTS OF THE INVENTION

It is therefore an aspect of the present invention to provide an improved non-transparent microvoided biaxially stretched film.

It is therefore a further aspect of the present invention to provide a process for producing an improved non-transparent microvoided biaxially stretched film.

It is therefore also an aspect of the present invention to provide a process for obtaining a transparent pattern in a non-transparent microvoided biaxially stretched film.

Further aspects and advantages of the invention will become apparent from the description hereinafter.

SUMMARY OF THE INVENTION

It has been that polymeric films comprising linear aromatic polyester as a continuous phase and dispersed uniformly therein an amorphous high polymer with a higher glass transition temperature than the glass transition temperature of the continuous phase with an increase in optical density measured in transmission with a visible filter of a factor of 19 or more can be realized by biaxial stretching at sufficiently low temperatures thereby providing an acceptable opacity for use as synthetic paper and for use in image recording elements as well as exhibiting a substantial change in optical density upon thermal treatment. Even upon pigmenting the polymeric films with 2% by weight of titanium dioxide, increases in optical density of 200% or more can be realized. Particularly high optical densities can be realized at polymeric film densities at or below 1.2 g/mL compared with accepted literature values for amorphous and crystalline polyethylene terephthalate of 1.34 g/mL and 1.5 g/mL respectively, see "Properties of Polymers—Correlations with Chemical Structure" by D. W. Van Krevelen, Elsevier, Amsterdam (1972).

Aspects of the present invention are realized by a non-transparent microvoided biaxially stretched self-supporting non-laminated polymeric film, the film comprising linear polyester as a continuous phase and dispersed uniformly therein an amorphous high polymer with a higher glass transition temperature than the glass transition temperature of the continuous phase and/or a crystalline high polymer having a higher melting point than the glass transition temperature of said continuous phase, wherein said linear polyester consists essentially of aromatic dicarboxylate and aliphatic dimethylene monomer units; the polymeric film has an optical density measured in transmission with a visible filter; and at least 50% of the optical density is due to microvoids.

Aspects of the present invention are also realized by the use of the above-described non-transparent microvoided biaxially stretched film as a synthetic paper.

Aspects of the present invention are also realized by an image recording element comprising the above-described non-transparent microvoided biaxially stretched film.

Aspects of the present invention are also by a process for obtaining a transparent pattern comprising the step of: image-wise application of heat optionally supplemented by the application of pressure to the above-described non-transparent microvoided biaxially stretched film.

Preferred embodiments of the present invention are disclosed in the detailed description of the invention.

DETAILED DESCRIPTION OF THE INVENTION

Definitions

The term voids or microvoids, as used in disclosing the present invention, means microcells, minute closed cells, cavities, bubbles or pores or cellulation, which, for example, can be formed in an oriented polymeric film during stretching as the result of a void-initiating particle initiated by particles that are immiscible with the polyester matrix. The voids or microvoids can be unfilled or filled with air or a vapour of some sort. Even if initially unfilled the voids or microvoids may over time become filled with air or a vapour of some sort.

The term "opaque", means a percentage opacity to visible light of greater than 90% as determined according to ASTM D589-97 or according to opacity test T425m-60 as published by TAPPI, 360 Lexington Avenue, New York, USA.

The term film, as used in disclosing the present invention, is an extruded sheet of a particular composition or a sheet consisting of a multiplicity of films with the same or different compositions produced by co-extrusion of liquids with the same or different compositions in contact with one another. The terms film and foil are used interchangeably in the present disclosure.

The term foam, as used in disclosing the present invention, means a substance that is formed by trapping many gas bubbles in a liquid or solid.

The term dicarboxylate monomer unit in a linear polyester, as used in disclosing the present invention, means a monomer unit derived either from a dicarboxylic acid or an ester thereof.

The term dimethylene aliphatic monomer unit in a linear polyester, as used in disclosing the present invention, means a monomer unit derived from a dimethylene aliphatic diol or an ether thereof, wherein the term aliphatic includes alicyclic.

The term linear polyester, as used in disclosing the present invention, means a polyester comprising hydrocarbon dimethylene and dicarboxylate monomer units.

The term linear aromatic polyester, as used in disclosing the present invention, means a polyester comprising aliphatic dimethylene and aromatic dicarboxylate monomer units.

The term density, as used in disclosing the present invention, means the weight of a 100 mm×100 mm piece of film with a thickness measured in contact with an inductive probe with ball tip 3 mm in diameter divided by its volume. This value assumes that the surfaces of the piece of film are flat and parallel to one another. This value corresponds to the apparent density values reported in EP-A 0 496 323 and WO 2005/105903A.

The term inorganic opacifying pigment, as used in disclosing the present application, means a pigment capable of opacifying (i.e. rendering more opaque) which includes substantially white inorganic pigments having a refractive index of at least 1.4 and pigments, which as a dispersion in a polymer are capable upon stetching of causing opacity due to microvoiding.

The term whitening agent, as used in disclosing the present invention, means a white/colourless organic compound which exhibits a blue luminescence under the influence of ambient UV-light.

The term "support", as used in disclosing the present invention, means a "self-supporting material" so as to distinguish it from a "layer" which may be coated as a solution or dispersion, evaporated or sputtered on a support, but which itself is not self-supporting. It also includes an optional conductive surface layer and any treatment necessary for, or layer applied to aid, adhesion.

The term "chain-polymerized block", as used in disclosing the present invention, excludes condensation polymers and means a chain-polymerized polymer chain which may a block in a block copolymer or graft copolymer or may just be a chain-polymerized polymer chain.

The term overprintable, as used in disclosing the present invention, means capable of being overprinted by conventional impact and/or non-impact printing processes.

The term conventional printing processes, as used in disclosing the present invention, includes but is not restricted to ink-jet printing, intaglio printing, screen printing, flexographic printing, offset printing, stamp printing, gravure printing, dye transfer printing, thermal sublimation printing and thermal and laser-induced processes.

The term pattern, as used in disclosing the present invention, means a non-continuous layer which can be in any form of lines, squares, circles or any random configuration.

The term layer, as used in disclosing the present invention, means a (continuous) coating covering the whole area of the entity referred to e.g. a support.

The term "non-transparent film", as used in disclosing the present invention, means a film capable of providing sufficient contrast to a transparent image to make the image clearly perceptible. A non-transparent film can be an "opaque film", but need not necessarily be completely opaque in that there is no residual translucence i.e. no light penetration through the film. Optical density in transmission as measured with a MacBeth TR924 densitometer through a visible filter can provide a measure of the non-transparency of a film. ISO 2471 concerns the opacity of paper backing and is applicable when that property of a paper is involved that governs the extent to which one sheet visually obscures printed matter on underlying sheets of similar paper and defines opacity as "the ratio, expressed as a percentage, of the luminous reflectance factor of a single sheet of the paper with a black backing to the intrinsic luminous reflectance factor of the same sample with a white reflecting backing. 80 g/m$^2$ copy paper, for example, is white, non-transparent and has an optical density of 0.5 as measured with a MacBeth TR924 densitometer through a yellow filter according to ISO 5-2 and metallized films typically have an optical density ranging from 2.0 to 3.0.

The term transparent, as used in disclosing the present invention, means having the property of transmitting at least 50% of the incident visible light without diffusing it and preferably at least 70% of the incident visible light without diffusing it.

The term flexible, as used in disclosing the present invention, means capable of following the curvature of a curved object such as a drum e.g. without being damaged.

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the dispersion medium under the pertaining ambient conditions, hence having a solubility of less than 10 mg/L therein.

Polymeric Film

Aspects of the present invention are realized by a non-transparent microvoided biaxially stretched self-supporting non-laminated polymeric film, the film comprising linear polyester as a continuous phase and dispersed uniformly therein an amorphous high polymer with a higher glass transition temperature than the glass transition temperature of the continuous phase and/or a crystalline high polymer having a higher melting point than the glass transition temperature of said continuous phase, wherein said linear polyester consists essentially of aromatic dicarboxylate and aliphatic dimethylene monomer units; the polymeric film has an optical density measured in transmission with a visible filter; and at least 50% of the optical density is due to microvoids, with at least 60% of the optical density due to microvoids being preferred and at least 70% of the optical density due to microvoids being particularly preferred. The aromatic dicarboxylate monomer units are derived from aromatic dicarboxylic acids or aromatic dicarboxylic acid esters and the aliphatic dimethylene monomer units are derived from aliphatic diols or aliphatic diol ethers.

According to a second embodiment of the polymeric film, according to the present invention, the concentration of the uniformly dispersed amorphous high polymer or the crystalline high polymer in the polymer film is 5 to 35% by weight, preferably 9 to 25% by weight.

According to a third embodiment of the polymeric film, according to the present invention, the weight ratio of the linear polyester to the amorphous polymer or the crystalline high polymer dispersed therein is in the range of 1.85:1 to 19.0:1, with a range of 2.7:1 to 13:1 being preferred, 3.0:1 to 10:1 being particularly preferred.

According to a fourth embodiment of the polymeric film, according to the present invention, the amorphous high polymer particles dispersed in the continuous phase have a diameter of less than 10 μm, with particles having a number average particle size of 0.5 to 5 μm being preferred and particles with an average particle size of 1 to 2 μm being particularly preferred. The smaller the particle size, the higher the opacity.

According to a fifth embodiment of the polymeric film, according to the present invention, the polymeric film further comprises an ingredient selected from the group consisting of whitening agents, UV-absorbers, light stabilizers, antioxidants, flame retardants and colourants.

According to a sixth embodiment of the polymeric film, according to the present invention, the polymer film is exclusive of a polyether such as polyethylene oxide. Such poly-ethers decrease the density and may decompose producing additional non-uniformly distributed voids.

According to a seventh embodiment of the polymeric film, according to the present invention, the polymer film is a coextrudate. Coextrusion comprises feeding at least two polymeric film compositions into separate extruders, laminating the compositions in a molten state and extruding them from a die. At least one of the coextruded layers will have a linear polyester as a continuous phase and dispersed uniformly therein an amorphous high polymer with a higher glass transition temperature than the glass transition temperature of the continuous phase and/or a crystalline high polymer having a higher melting point than the glass transition temperature of said continuous phase.

According to an eighth embodiment of the polymeric film, according to the present invention, the polymeric film is provided with at least one of alphanumeric characters, an embossed pattern, an optionally embossed hologram and a continuous, half-tone or digital image.

According to a ninth embodiment of the polymeric film, according to the present invention, the film is provided on at least one side with a transparent overprintable layer i.e. suitable for impact or non-impact printing. This transparent overprintable layer can be provided over at least one of alphanumeric characters, an embossed pattern, an optionally embossed hologram and a continuous, half-tone or digital image on a surface of the non-transparent microvoided biaxially stretched self-supporting film.

According to a tenth embodiment of the polymeric film, according to the present invention, the film is provided on at least one side with a transparentizable porous overprintable layer i.e. suitable for impact or non-impact printing e.g. inkjet printing. Transparentizable porous layers transparentized by the application of a liquid with an appropriate refractive index, which can also be applied image-wise, are as disclosed in EP-A 1 362 710 and EP-A 1 398 175. This transparentizable overprintable layer can be provided over at least one of alphanumeric characters, an embossed pattern, an optionally embossed hologram and a continuous, half-tone or digital image on a surface of the non-transparent microvoided biaxially stretched self-supporting film with a transparent pattern.

Transparentization of part of the transparentizable porous receiving layer can itself produce an image or the non-transparentized area of the opaque porous receiving layer can itself represent an image. The transparent pattern can, for example, be part of a banknote, a share certificate, a ticket, a credit card, an identity document or a label for luggage and packages.

According to an eleventh embodiment of the polymeric film, according to the present invention, the polymeric film has a thickness in the range from about 10 µm to about 500 µm, with from about 50 µm to about 300 µm being preferred.

According to a twelfth embodiment of the polymeric film, according to the present invention, the polymeric film is provided with a subbing layer. This subbing layer makes it possible to improve wettability and adhesive property of the polymeric film and preferably comprises a polyester resin, a polyurethane resin, a poly(ester urethane) resin or an acrylic resin.

According to a thirteenth embodiment of the polymeric film, according to the present invention, the density is 1.2 g/mL or less, with a density of 1.15 g/mL or less being preferred and a density of 1.1 g/mL or less being particularly preferred.

The polymeric film, according to the present invention, can be realized by a process for preparing a non-transparent microvoided biaxially stretched film comprising the steps of:

i) mixing at least one linear polyester having monomer components consisting essentially of at least one aromatic dicarboxylic acid and at least one aliphatic diol and an amorphous high polymer with a higher glass transition temperature than the glass transition temperature of said continuous phase and/or a crystalline high polymer having a higher melting point than the glass transition temperature of said continuous phase and optionally at least one ingredient from the group of ingredients consisting of inorganic opacifying pigments, whitening agents, UV-absorbers, light stabilizers, antioxidants and flame retardants in a kneader or an extruder, ii) forming the mixture produced in step i) in a thick film followed by quenching to room temperature; iii) longitudinally stretching the thick film at a stretching tension of >4 N/mm$^2$ at a temperature between the glass transition temperature of the amorphous polymer and the glass transition temperature of the linear polyester or between the melting point of the crystalline polymer and the glass transition temperature of the linear polyester to at least twice the initial length; and iv) transversely stretching the longitudinally stretched film from step (iii) at a stretching tension of >4 N/mm$^2$ at a temperature between the glass transition temperature of the amorphous polymer and the glass transition temperature of the linear polyester or between the melting point of the crystalline polymer and the glass transition temperature of the linear polyester to at least twice the initial length, wherein the weight ratio of the linear polyester to the amorphous polymer or crystalline polymer is in the range 1.85:1 to 19.0:1.

The quenched extruded thick film has a thickness of approximately 10 to approximately 6000 µm, with a thickness of approximately 100 µm to 5000 µm being preferred.

The biaxially stretched polymeric film, according to the present invention, is realized by first stretching in one direction (e.g. in the machine direction=MD) and then stretching in a second direction [e.g. perpendicularly to the machine direction=TD (transversal direction)]. This orients the polymer chains thereby increasing the density and crystallinity. Longitudinal orientation in the direction of extrusion can be carried out with the aid of two rolls running at different speeds corresponding to the desired stretching ratio by setting the surface speed V2 of the rotating rollers relative to the linear extrusion speed V1 so that the stretch ratio is V2/V1. The longitudinal stretching ratio should be sufficient to create voids.

The longitudinal stretching operations known in the art to produce biaxially oriented polyester film may be used. For instance, the combined film layers are passed between a pair of infra red heaters which heats the layers to a temperature above the glass transition temperature of the polyester (about 80° C. for polyethylene terephthalate) in the region where the stretching occurs. The temperature above should be close to the glass transition temperature of the continuous phase polymer in order to improve opacity. In the case of polyethylene terephthalate, the longitudinal stretching is generally carried out at from about 80 to about 130° C. During longitudinal stretching opacity is realized as a result of the voids produced in the film extending longitudinally from each particle of dispersed polymer.

Transverse stretching is carried out at an angle substantially 90° to the direction of longitudinal stretching, with the angle being typically between about 70° and 90°. For transverse orientation use is generally made of an appropriate tenter frame, clamping both edges of the film and then drawing toward the two sides by heating the combined layers with the primer layer(s) thereon by, for example, passing through hot air heaters which heat the film above the glass transition temperature. In the case of polyethylene terephthalate and its copolymers, the transverse stretching is carried out at from about 80 to about 170° C., with from about 85 to about 150° being preferred. The transverse stretching of the film causes the voids to extend transversely.

The production of the biaxially stretched polymeric film, according to the present invention, is preferably produced by longitudinally stretching the thick film at a stretching tension >2.5 N/mm$^2$, with a stretching tension >5.0 N/mm$^2$ being preferred and a stretching tension >7.0 N/mm$^2$ being particularly preferred. After optional intermediate quenching the longitudinal stretching is followed by transverse stretching at an angle substantially 90° to the first stretching process to at least twice the initial length at a stretching tension of >2.5 N/mm$^2$, with a stretching tension of >4.0 N/mm$^2$ being preferred, at a temperature preferably at or below 30° C. above the glass transition temperature of the continuous phase and preferably at or below 20° C. above the glass transition temperature of the continuous phase. The realizable stretching tension increases with decreasing stretching temperature.

Longitudinal and transverse stretching may be performed simultaneously e.g. with an apparatus produced by Brückner.

The production process may further comprise, as a further step, a thermal fixation step to counter shrinkage.

The stretching ratio for longitudinal stretching is preferably between about 2 and about 6, with between about 2.5 and about 5 being preferred and between 3 and 4 being particularly preferred. The higher the stretching ratio, the higher the opacity.

Transverse stretching ratio is preferably in the range of from about 2 to about 6, with a range of 2.5 to about 5 being preferred and a range of from about 3 to about 4 being particularly preferred. The opacity increases at higher stretching rates in %/min and also at lower transverse stretching temperatures.

The biaxially stretched film is finally passed through a second set of hot air heaters which blow hot air at a temperature of between 140 and 240° C. onto the film layers to heat-set or thermofix the film layers. The heat-set temperature must be sufficient to obtain crystallization of the polyester but care must be taken not to overheat the layers since the voids can collapse. On the other hand increasing the heat-set temperature improves the dimensional stability of the film. An appropriate mix of properties can be obtained by varying the heat-set temperature. The preferred heat-set or thermofixation temperature in the case of polyethylene terephthalate or polyethylene naphthalate is at or above 140° C.

Before or after longitudinal stretching a first subbing layer, called a primer layer, may be applied to the non-voided polyester layer by a coating means such as an air knife coating system. The first subbing layer is for example formed from a (meth)acrylate copolymer, a poly(meth)acrylate, a polyurethane, a sulphonated polyester, a styrene-(meth)acrylate copolymer or a chloride containing copolymer such as vinylidene chloride copolymer in latex form having some hydrophilic functionality through the presence of a copolymerized unsaturated carboxylic acid which is applied as an aqueous dispersion.

According to a fourteenth embodiment of the polymeric film, according to the present invention, the polymeric film is exclusive of foam.

According to a fifteenth embodiment of the polymeric film, according to the present invention, the polymeric film is exclusive of foaming agent and/or decomposition products of a foaming agent.

Optical Density of the Film Due to Microvoids

The optical density of the film measured in transmission with a visible filter due to microvoids is obtained by measuring the optical density of the film without void-producing ingredients as a function of film thickness to provide comparative values. The optical density of a film measured in transmission with a visible filter due to voids is then obtained by biaxially stretching a composition to which has been added the void-inducing ingredient and subtracting the measured optical density measured in transmission with a visible filter from the optical density measured in transmission with a visible filter for the film composition without void-inducing ingredient for the film thickness expected on the basis of the longitudinal and transverse drawing ratios.

Linear Polyester

According to a sixteenth embodiment of the polymeric film, according to the present invention, the number average molecular weight of the linear polyester is 10,000 to 30,000.

According to a seventeenth embodiment of the polymeric film, according to the present invention, the linear polyester is poly(ethylene terephthalate) or a copolymer thereof.

Examples of suitable aromatic dicarboxylates include terephthalate, isophthalate, phthalate and naphthalene dicarboxylates, and mixtures thereof.

According to an eighteenth embodiment of the polymeric film, according to the present invention, the aromatic dicarboxylate monomer units are selected from the group consisting of terephthalate, isophthalate and naphthalene dicarboxylates.

According to a nineteenth embodiment of the polymeric film, according to the present invention, at least 1 mole % of the aromatic dicarboxylate monomer units in the linear polyester are isophthalate monomer units, with at least 3 mole % being preferred and at least 5 mole % being particularly preferred.

According to a twentieth embodiment of the polymeric film, according to the present invention, 30 mole % or less of the aromatic dicarboxylate acid monomer units in the linear polyester are isophthalate monomer units, with 20 mole % or less being preferred, 18 mole % or less being particularly preferred and 15% or less being especially preferred.

Examples of suitable aliphatic dimethylenes include ethylene, propylene, methylpropylene, tetramethylene, pentamethylene, hexamethylene, neopentylene [—CH$_2$C(CH$_3$)$_2$—CH$_2$], 1,4-cyclohexane-dimethylene, 1,3-cyclohexane-dimethylene, 1,3-cyclopentane-dimethylene, norbornane-dimethylene, —CH$_2$CH$_2$(OCH$_2$CH$_2$)$_n$—, where n is an integer with 1 to 5 being preferred, and mixtures thereof.

According to a twenty-first embodiment of the polymeric film, according to the present invention, the aliphatic dimethylene monomer units are selected from the group consisting of ethylene, diethylene ether, tetramethylene, neopentylene, 2-endo,3-endo norbornane dimethylene and 1,4-cyclohexane-dimethylene.

According to a twenty-second embodiment of the polymeric film, according to the present invention, at least 1 mole % of the aliphatic dimethylene monomer units in the linear polyester are neopentylene or 1,4-cyclohexanedimethylene monomer units, with at least 3 mole % being preferred and at least 5 mole % being particularly preferred.

According to a twenty-third embodiment of the polymeric film, according to the present invention, 30 mole % or less of the aliphatic dimethylene monomer units in the linear polyester are neopentylene or 1,4-cyclohexanedimethylene monomer units, with 20 mole % or less being preferred, 18 mole % or less being particularly preferred and 15% or less being especially preferred.

According to a twenty-fourth embodiment of the polymeric film, according to the present invention, the linear polyester comprises at least one linear aromatic polyester resin. Upon heating, e.g. during mixing in an extruder, the different linear aromatic polyester resins present will undergo metathesis, condensing and decondensing so as to evolve upon sufficiently long heating into a single resin.

Such polyesters are well known in the art and may be produced by well-known techniques, for example, those described in U.S. Pat. No. 2,465,319 and U.S. Pat. No. 2,901,466.

According to a twenty-fifth embodiment of the polymeric film, according to the present invention, the polymeric film further contains an electroconductivity enhancing additive e.g. a metallic salt which ionizes in the melt giving enhanced electroconductivity such as magnesium acetate, manganese salts and cobalt sulphate. Suitable salt concentrations are about $3.5 \times 10^{-4}$ moles/mole polyester. Enhanced polyester melt viscosity enables improved pinning of the melt on the chilling roller maintained at a temperature of 5 to 25° C. (preferably 15 to 30° C.) to cool the extrudate thereby enabling higher stretching forces to be realized and hence enhanced void-forming and a higher degree of opacification.

According to a twenty-sixth embodiment of the polymeric film, according to the present invention, the linear polyester is a polymer having aromatic dicarboxylate monomer units selected from the group consisting of terephthalate, isophthalate and naphthalene dicarboxylates and aliphatic dimethylene monomer units selected from the group consisting of ethylene, tetramethylene, neopentylene and 1,4-cyclohexanedimethylene.

Poly(ethylene terephthalate), which may be modified by small amounts of other monomers, is especially preferred. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. No. 4,420,607, U.S. Pat. No. 4,459,402 and U.S. Pat. No. 4,468,510.

The linear polyester utilized in the present invention should have a glass transition temperature from 40° C. to 150° C., preferably from 50 to 120° C. and should be orientable.

According to a twenty-seventh embodiment of the polymeric film, according to the present invention, the linear polyester has an inherent viscosity determined in a 0.5 g/dL solution of 60 wt % phenol and 40 wt % ortho-dichlorobenzene at 25° C. of at least 0.45 dl/g with an inherent viscosity of 0.48 to 0.9 dl/g being preferred and an inherent viscosity of 0.5 to 0.8 dl/g being particularly preferred.

Examples of a suitable continuous phase include a blend comprising poly(ethylene terephthalate) and poly(1,4-cyclohexylene dimethylate terephthalate) and a blend comprising poly(ethylene terephthalate) and poly(neopentylene terephthalate).

Amorphous High Polymer

The amorphous high polymer used in the polymeric film, used in the present invention, has a glass transition temperature higher than the glass transition temperature of the continuous phase in which it is dispersed e.g. a linear polyester. Poly(ethylene terephthalate), for example, has a glass transition temperature of ca. 80° C.

The glass transition temperatures and refractive indices for various amorphous high polymers are given in the table below:

| | $T_g$ [° C.] | Refractive index for sodium line at 589.3 nm [ASTM D642] |
|---|---|---|
| polystyrene | 100 | 1.57-1.60 |
| poly-α-methyl-styrene | 168 | 1.610 |
| poly-4-methyl-styrene | 93 | — |
| poly-α-vinyl-naphthalene | 159 | 1.6818 |
| polyacrylonitrile | 85 | 1.514, 1.5187 |
| polymethacrylonitrile | 120 | 1.520 |
| polymethyl methacrylate | 105 | 1.49, 1.4893 |
| polyacrylamide | 165 | — |
| copolymer of acrylonitrile and styrene | 112 | 1.56-1.57, 1.57 |
| copolymer of 28.5 wt % acrylonitrile and 71.5 wt % styrene | 108 | 1.56-1.57, 1.57 |
| ABS | 110 | 1.53-1.54 |

According to a twenty-eighth embodiment of the polymeric film, according to the present invention, the uniformly dispersed amorphous high polymer is crosslinked or non-crosslinked.

According to a twenty-ninth embodiment of the polymeric film, according to the present invention, the amorphous high polymer comprises at least one chain-polymerized block.

According to a thirtieth embodiment of the polymeric film, according to the present invention, the amorphous high polymer comprises at least one chain-polymerized block and the at least one chain-polymerized block is selected from the group consisting of polystyrene, styrene copolymers, SAN-polymers, polyacrylates, acrylate-copolymers, polymethacrylates and methacrylate-copolymers.

According to a thirty-first embodiment of the polymeric film, according to the present invention, the amorphous high polymer comprises at least one chain-polymerized styrene copolymer block selected from the group consisting of SAN-polymers, ABS-polymers and SBS-polymers.

According to a thirty-second embodiment of the polymeric film, according to the present invention, the amorphous high polymer comprises at least one chain-polymerized SAN-polymer block, wherein the concentration of AN-monomer units in the SAN-polymer is 15 to 35% by weight.

According to a thirty-third embodiment of the polymeric film, according to the present invention, the amorphous high polymer is a SAN-polymer and the SAN-polymer is in the range of 2.0:1 to 9.0:1.

According to a thirty-fourth embodiment of the polymeric film, according to the present invention, the amorphous high polymer is exclusive of a cellulose ester.

According to a thirty-fifth embodiment of the polymeric film, according to the present invention, the amorphous high polymer is at least partially crosslinked e.g. at least partially crosslinked poly(methyl methacrylate) or at least partially crosslinked copolymers of acrylonitrile and styrene.

According to a thirty-sixth embodiment of the polymeric film, according to the present invention, the film has a linear polyester as continuous phase and dispersed therein is a high polymer having a degree of crosslinking of at least 10%.

According to a thirty-seventh embodiment of the polymeric film, according to the present invention, the amorphous high polymer is a SAN polymer, the SAN polymer concentration being preferably at least 5% by weight of the film, with at least 10% by weight of the film being particularly preferred.

The SAN polymer additive of the present composition is a known class of polymer consisting essentially of a random copolymer of a styrenic monomer component, including styrene as well as an alpha-lower alkyl-substituted styrene or mixtures thereof and an acrylonitrilic monomer component including acrylonitrile as well as an alpha-lower alkyl substituted acrylonitrile or mixtures thereof. By lower-alkyl is meant a straight or branched chain alkyl group of 1 to 4 carbon atoms exemplified by the methyl, ethyl, isopropyl and t-butyl groups. In readily available SAN polymers, the styrene component is generally styrene, alpha-straight chain alkyl substituted styrene, typically alpha-methyl-styrene, or mixtures thereof with styrene being preferred. Similarly in the readily available SAN polymers, the acrylonitrile component is generally acrylonitrile, alpha-methyl-acrylonitrile or mixtures thereof with acrylonitrile being preferred.

In the SAN polymer the styrene component is present in a major weight proportion, i.e. in a weight proportion of greater than 50%, typically about 65% to about 90%, especially about 70% to about 80%, based on the combined weight of the styrene component and the acrylonitrile component. The acrylonitrile component is present in a minor proportion, i.e. in a weight proportion of less than 50%, typically about 10% to about 35% especially about 20% to 30% based on the combined weight of the styrene monomer component and the acrylonitrile monomer component. Styrene-acrylonitrile copolymers are currently commercially available with an acrylonitrile content of 15 to 35% by weight, with 18 to 32% by weight being preferred and 21 to 30% by weight being particularly preferred.

According to a thirty-eighth embodiment of the polymeric film, according to the present invention, the amorphous high polymer is a SAN polymer in which the concentration of AN-monomer units is 15 to 35% by weight.

The SAN polymer class is more particularly identified and described in R. E. Gallagher, U.S. Pat. No. 3,988,393, issued Oct. 26, 1976 (especially at Column 9, lines 14-16 and in Claim 8), in "Whittington's Dictionary of Plastics", Technomic Publishing Co., First Edition, 1968, page 231, under the section headed "Styrene-Acrylonitrile Copolymers (SAN)", and R. B. Seymour, "Introduction to Polymer Chemistry", McGraw-Hill, Inc., 1971, page 200, (last two lines) to page 201 (first line). The preparation of a SAN polymer by copolymerization of styrene and acrylonitrile is more particularly described in the "Encyclopedia of Polymer Science and Technology", John Wiley and Sons, Inc., Vol. 1, 1964, pages 425-435.

According to a thirty-ninth embodiment of the polymeric film, according to the present invention, the amorphous high polymer is a non-crosslinked SAN polymer having a number average molecular weight in the range of 30,000 to 100,000, preferably in the range of 40,000 to 80,000. Typical SAN-polymers have number averaged molecular weights of 45,000 to 60,000 and polymer dispersities ($M_w/M_n$) of 1.2 to 2.5.

According to a fortieth embodiment of the polymeric film, according to the present invention, the amorphous high polymer is a non-crosslinked SAN polymer having a weight average molecular weight in the range of 50,000 to 200,000, preferably in the range of 75,000 to 150,000. The higher the molecular weight of the SAN polymer, the larger the size of the dispersed SAN polymer particles.

Crystalline High Polymer

The crystalline high polymer used in the polymeric film, according to the present invention, has a melting point higher than the glass transition temperature of the continuous phase polymer in which it is dispersed e.g. a linear polyester. Crystalline high polymers with sufficiently high melting points include polyethylene, polypropylene and poly(4-methyl-1-pentene).

According to a forty-first embodiment of the polymeric film, according to the present invention, the film has a linear polyester as continuous phase and dispersed therein are crystalline high polymer particles having a number averaged particle size of 0.5 to 5 μm, with 1 to 2 μm being preferred.

The melting points and refractive indices for various polyethylenes and polypropylenes are given in the table below:

| | $T_m$ [° C.] | Refractive index for sodium line at 589.3 nm [ASTM D642] |
|---|---|---|
| polyethylene | 95 | 1.51-1.54 |
| high density polyethylene | 141 | 1.51-1.54 |
| isotactic polypropylene | 165 | 1.49 |
| syndiotactic polypropylene | 189 | 1.49 |
| polypropylene (atactic) | | 1.4735 |
| poly(4-methylpentene) | 235 | 1.4630 |

Inorganic Opacifying Pigment

According to a forty-second embodiment of the polymeric film, according to the present invention, the polymeric film further comprises at least one inorganic opacifying pigment.

According to a forty-third of the polymeric film, according to the present invention, the film further comprises at least one inorganic opacifying pigment selected from the group consisting of silica, zinc oxide, zinc sulphide, lithopone, barium sulphate, calcium carbonate, titanium dioxide, aluminium phosphate and clays. The titanium dioxide may have an anatase or rutile morphology and may be stabilized by alumina oxide and/or silicon dioxide. The aluminium phosphate can be an amorphous hollow pigment e.g. the Biphor™ pigments from BUNGE.

The refractive indices of these pigments is given in the table below:

| inorganic opacifying pigment | refractive index for sodium line at 589.3 nm |
|---|---|
| kaolinite | 1.53-1.57 |
| bentonite | 1.557 |
| china clay | 1.56 |
| silica - silica gel | 1.55 |
| silica - cristobalite | 1.487, 1.484 |
| silica - quartz | 1.544, 1.553 |
| calcium carbonate | 1.59, 1.6, 1.58 |
| calcium carbonate - calcite | 1.486, 1.64-1.66 |
| barium sulphate - baryte | 1.637, 1.638, 1.649, 1.64 |
| Lithopone 30% (zinc sulphide/barium sulphate) | 1.84 |
| zinc oxide (ultrafine) | 1.9 |
| zinc oxide (zincite) | 2.008, 2.029 |
| zinc sulphide | 2.37 |
| titanium dioxide - anatase | 2.554, 2.493, 2.55 |
| titanium dioxide - rutile | 2.616, 2.903, 2.76 |

According to a forty-fourth embodiment of the polymeric film, the film comprises ≦5% by weight of inorganic opacifying pigment i.e. the total quantity of inorganic opacifying pigment present regardless of type is ≦5% by weight, with ≦3% by weight of inorganic opacifying pigment being preferred.

According to a forty-fifth embodiment of the polymeric film, according to the present invention, the film further comprises an inorganic opacifying pigment having a number averaged particle size between 0.1 and 10 µm, with 0.2 to 2 µm being preferred.

Addition of an inorganic opacifying pigment has the advantage of stabilizing the orientation of the polyester, so that the non-transparent microvoided biaxially stretched self-supporting film can be stabilized at temperatures of 175° C. without substantially affecting the opacity of the non-transparent microvoided biaxially stretched self-supporting film. Without the presence of an inorganic opacifying pigment, such as $BaSO_4$ or $TiO_2$, thermofixing of the polyester is possible, but only at the expense of some of the opacity of the non-transparent microvoided biaxially stretched self-supporting film. Moreover, pigments with a refractive index below 2.0 do not of themselves provide substantial opacity due to the small refractive index differences between the pigment and the polymer matrix.

Titanium dioxide particles dispersed in polymer films have been found not to induce microvoiding upon stretching the films.

Whitening Agent

According to a forty-sixth embodiment of the polymeric film, according to the present invention, according to the present invention, the concentration of whitening agent is ≦0.5% by weight, with ≦0.1% by weight being preferred, ≦0.05% by weight being particularly preferred, ≦0.035% by weight being especially preferred.

According to a forty-seventh embodiment of the polymeric film, according to the present invention, the film further comprises a whitening agent selected from the group consisting of bis-benzoxazoles e.g. bis-benzoxazolyl-stilbenes and bis-benzoxazolyl-thiophenes; benzotriazole-phenylcoumarins; naphthotriazole-phenylcoumarins; triazine-phenylcoumarins and bis(styryl)biphenyls.

Suitable whitening agents are:

| | | |
|---|---|---|
| UVITEX ® OB | | CIBA |
| UVITEX ® OB-ONE | | CIBA |
| Eastobrite OB | 2,5-thiophenediylbis(5-tert-butyl-1,3-benzoxazole) bis-benzoxazolyl-stilbene bis-benzoxazolyl-thiophene | Eastman Chemical |

Flame Retardant

According to a forty-eighth embodiment of the polymeric film, according to the present invention, the film further comprises a flame retardant.

According to a forty-ninth embodiment of the polymeric film, according to the present invention, the film further comprises a flame retardant selected from the group consisting of: brominated compounds; organophosphorus compounds; melamine; melamine-derivatives, e.g. melamine salts with organic or inorganic acids such as boric acid, cyanuric acid, phosphoric acid or pyro/poly-phosphoric acid, and melamine homologues such as melam, melem and melon; metal hydroxides e.g. aluminium hydroxide and magnesium hydroxide; ammonium polyphosphates and zinc borate e.g. with a composition of $xZnO.yB_2O_3.zH_2O$ such as $2ZnO.3B_2O_3.3.5H_2O$.

Suitable flame retardants include:

| | | |
|---|---|---|
| SAYTEX ® HP-7010 P/G | brominated polystyrene | Albemarle Corporation |
| SAYTEX ® HP-3010 | brominated polystyrene | Albemarle Corporation |
| SAYTEX ® 8010 | ethane-1,2-bis(pentabromophenyl) | Albemarle Corporation |
| SAYTEX ® BT-93 | ethylene bis-tetrabromophthalimide | Albemarle Corporation |
| SAYTEX ® BT-93W | Ethylene bis-tetrabromophthalimide | Albemarle Corporation |
| SAYTEX ® CP-2000 | brominated compound | Albemarle Corporation |
| SAYTEX ® 120 | tetradecabromo-diphenoxy benzene | Albemarle Corporation |
| SAYTEX ® 102E | Decabromodiphenyl oxide | Albemarle Corporation |
| SAYTEX ® 9006L | brominated compound | Albemarle Corporation |
| SAYTEX ® HP-900 | brominated compound | Albemarle Corporation |
| SAYTEX ® HP-800A | brominated compound | Albemarle Corporation |
| SAYTEX ® HP-800AG | brominated compound | Albemarle Corporation |
| SAYTEX ® BC70HS | brominated compound | Albemarle Corporation |
| NcendX P-30 | organophosphorus compound | Albemarle Corporation |
| MARTINAL ® OL-104 | aluminium hydroxide | Albemarle Corporation |
| MARTINAL ® OL-104/LE | aluminium hydroxide | Albemarle Corporation |
| MARTINAL ® OL-104/WE | aluminium hydroxide | Albemarle Corporation |
| MARTINAL ® OL-104/LFF | aluminium hydroxide | Albemarle Corporation |
| MARTINAL ® OL-104/LCD | aluminium hydroxide | Albemarle Corporation |
| MARTINAL ® OL-107 | aluminium hydroxide | Albemarle Corporation |
| MARTINAL ® OL-107/LE | aluminium hydroxide | Albemarle Corporation |
| MARTINAL ® OL-107/LFF | aluminium hydroxide | Albemarle Corporation |
| MARTINAL ® OL-107/LCD | aluminium hydroxide | Albemarle Corporation |
| MARTINAL ® OL/Q-107 | aluminium hydroxide | Albemarle Corporation |
| MARTINAL ® OL-111/LE | aluminium hydroxide | Albemarle Corporation |
| MAGNIFIN ® H3 | magnesium hydroxide | Albemarle Corporation |
| MAGNIFIN ® H5 | magnesium hydroxide | Albemarle Corporation |
| MAGNIFIN ® H7 | magnesium hydroxide | Albemarle Corporation |
| MAGNIFIN ® H10 | magnesium hydroxide | Albemarle Corporation |
| MAGNIFIN ® T2C | magnesium hydroxide | Albemarle Corporation |
| MAGNIFIN ® T3C | magnesium hydroxide | Albemarle Corporation |
| MELAPUR ® MCXL | melamine cyanurate | CIBA |
| MELAPUR ® MC50 | melamine cyanurate | CIBA |
| MELAPUR ® MC25 | melamine cyanurate | CIBA |
| MELAPUR ® 200 70 | melamine polyphosphate | CIBA |
| MELAPUR ® MP | melamine phosphate | CIBA |
| FIREBRAKE ® ZB | a zinc borate compound | LUZENAC |

-continued

| | | |
|---|---|---|
| FIREMASTER® PBS-64 | brominated styrene-based technology | GREAT LAKES CHEMICAL CORP. |
| FIREMASTER® PBS-64HW | brominated styrene-based technology | GREAT LAKES CHEMICAL CORP. |
| FIREMASTER® CP-44B | copolymer of brominated styrene & glycidyl methacrylate | GREAT LAKES CHEMICAL CORP. |

Antioxidant

According to a fiftieth embodiment of the polymeric film, according to the present invention, the film further comprises an antioxidant.

According to a fifty-first embodiment of the polymeric film, according to the present invention, the film further comprises an antioxidant selected for the group consisting of organotin derivatives, sterically hindered phenols, sterically hindered phenol derivatives and phosphites.

Suitable flame retardants include:

| | | |
|---|---|---|
| ETHANOX® 310 | Organotin catalyzed penta-erythritol tetrakis (3-(3,5-di-t-butyl-4-hydroxyphenyl)-propionate) | Albemarle Corporation |
| ETHANOX® 310TF | "Tin-free" pentaerythritol tetrakis (3-(3,5-di-t-butyl-4-hydroxyphenyl)propionate) | Albemarle Corporation |
| ETHANOX® 314 | 1,3,5-tris(3,5-di-tert-butyl-4-hydroxybenzyl)-1,3,5-tria-zine-2,4,6(1h, 3h, 5h)-trione | Albemarle Corporation |
| ETHANOX® 330 | 1,3,5-trimethyl-2,4,6-tris (3,5-di-tert-butyl-4-hydroxy-benzyl) benzene | Albemarle Corporation |
| ETHANOX® 376 | octadecyl-3-(3,5-di-t-butyl-4-hydroxyphenyl)-propionate | Albemarle Corporation |
| ETHAPHOS™ 368 | tris-(2,4-di-t-butylphenyl) phosphite | Albemarle Corporation |
| ETHAPHOS™ 326 | Bis (2,4-di-t-butylphenyl) pentaerythritol diphosphite | Albemarle Corporation |
| IRGANOX® 259 | | CIBA |
| IRGANOX® 1010 | | CIBA |
| IRGANOX® 1425 | | CIBA |
| IRGANOX® B 900 | | CIBA |
| HOSTANOX® O 3 | Bis[3,3'-bis-(4'-hydroxy-3'-tert-butyl-phenyl)butanoic acid]glycol ester | CLARIANT |
| HOSTANOX® O 10 | tetrakis[methylene(3,5-di-t-butyl-4-hydroxy-benzyl)isocyanurate | CLARIANT |
| HOSTANOX® O 310 | 1/1 mixture of HOSTANOX® O 10 & HOSTANOX® O 3 | CLARIANT |
| HOSTANOX® 245 | ethylene bis(oxyethylene)bis-[3-(5-t-butyl-4-hydroxy-m-tolyl)-propionate] | CLARIANT |

Light Stabilizers

According to a fifty-second embodiment of the polymeric film, according to the present invention, the film further comprises a light stabilizer.

According to a fifty-third embodiment of the polymeric film, according to the present invention, the film further comprises a hindered amine light stabilizer.

Suitable light stabilizers include:

| | | |
|---|---|---|
| LS-01 | CHIMASSORB 119 | CIBA |
| LS-02 | CHIMASSORB 944 | CIBA |
| LS-03 | TINUVIN® 123 | CIBA |
| LS-04 | TINUVIN® 144 | CIBA |
| LS-05 | TINUVIN® 622 | CIBA |
| LS-06 | TINUVIN® 765 | CIBA |
| LS-07 | TINUVIN® 770 | CIBA |
| LS-08 | TINUVIN® 783 | CIBA |
| LS-09 | TINUVIN® 791 | CIBA |
| LS-10 | TINUVIN® B 75 | CIBA |
| LS-11 | TINUVIN® B 241 | CIBA |

UV-Absorbers

According to a fifty-fourth embodiment of the polymeric film, according to the present invention, the film further comprises a UV-absorber.

According to a fifty-fifth embodiment of the polymeric film, according to the present invention, the film further comprises an UV-absorber selected from the group consisting of benzotriazole derivatives and triazine derivatives.

Suitable UV-absorbers include:

| | | | |
|---|---|---|---|
| UV-01 | CHIMASSORB | | CIBA |
| UV-02 | TINUVIN® 213 | | CIBA |
| UV-03 | TINUVIN® 234 | | CIBA |
| UV-04 | TINUVIN® 327 | | CIBA |
| UV-05 | TINUVIN® 360 | | CIBA |
| UV-06 | TINUVIN® 1577 | | CIBA |
| UV-07 | HOSTAVIN® PR-25 | propanedioic acid, [(4-methoxy-phenyl)-methylene]-, dimethyl ester | CLARIANT |
| UV-08 | SANDUVOR® VSU | 2-ethyl-2'-ethoxy-oxalanilide | CLARIANT |
| UV-09 | HOSTAVIN® B-CAP | tetra-ethyl-2,2'-(1,4-phenylene-dimethylidene)-bismalonate | CLARIANT |
| UV-10 | HOSTAVIN® ARO 8 | 2-hydroxy-4-n-octyloxybenzophenone | CLARIANT |

Image Recording Element

Aspects of the present invention are also realized by an image recording element comprising the non-transparent microvoided biaxially stretched film, according to the present invention.

According to a first embodiment of the image recording element, according to the present invention, the film is provided on at least one side with a transparent overprintable layer i.e. for impact and non-impact printing.

According to a second embodiment of the image recording element, according to the present invention, the film is provided on at least one side with a non-transparent overprintable layer i.e. suitable for at least one impact and non-impact print technique.

According to a third embodiment of the image recording element, according to the present invention, the film is provided on at least one side with a non-transparent transparentizable overprintable layer i.e. i.e. suitable for at least one impact and non-impact print technique.

According to a fourth embodiment of the image recording element, according to the present invention, the film is provided on at least one side with an ink-jet receiving layer.

Typical receiving layers are either porous in the case of aqueous or solvent inks or pastes to enable rapid drying to the touch or are non-porous in the case of phase-change inks or curable inks e.g. radiation curable inks. Porous receiving layers typically comprise at least one pigment such as silica or alumina; at least one binder, such as an ammonium salt of a styrene-acrylate-acrylic acid terpolymer; a surfactant e.g. an anionic surfactant such as an aliphatic sulphonate; optionally a levelling agent, such as polydimethylsiloxane, and optionally a mordant.

According to a fifth embodiment of the image recording element, according to the present invention, the film is provided on at least one side with an imaging layer e.g. a photographic layer e.g. a silver halide emulsion layer; a photothermographic element and a substantially light-insensitive thermographic element; and the dye receiver layer of a dye thermal transfer system.

According to a sixth embodiment of the image recording element, according to the present invention, the film is provided on at least one side with a writable layer e.g. with a pencil, ball-point pen and fountain pen.

Process for Obtaining a Transparent Pattern

Aspects of the present invention have been realized by a process for obtaining a transparent pattern comprising the step of: image-wise application of heat optionally supplemented by the application of pressure to a non-transparent microvoided biaxially stretched self-supporting non-laminated polymeric film, the film comprising linear polyester as a continuous phase and dispersed uniformly therein an amorphous high polymer with a higher glass transition temperature than the glass transition temperature of the continuous phase and/or a crystalline high polymer having a higher melting point than the glass transition temperature of said continuous phase, wherein said linear polyester consists essentially of aromatic dicarboxylate and aliphatic dimethylene monomer units; the polymeric film has an optical density measured in transmission with a visible filter; and at least 50% of the optical density is due to microvoids.

According to a first embodiment of the process for obtaining a transparent pattern, according to the present invention, the heat is applied by a heated or hot stamp, a thermal head, a heated or hot bar or a laser. The heating can be carried out from one or both sides of the film. Optical density changes of at least 0.4 can be readily realized or up to 40% without significant changes in film thickness. Moreover, the transparentization effect realized by the process for obtaining a transparent pattern, according to the present invention, results from a combination of heat supplied by a heat source, the pressure between the heat source and the film and the time the heat source is applied. The heat has to be applied for at least 1 ms either continuously or non-continuously. Heating with a thermal head can be with a single heat pulse, but multiple short heating pulses are preferred to avoid overheating of the heating elements. When a thermal head is used a foil can be used between the thermal head and the non-transparent microvoided biaxially stretched self-supporting film during the heating process e.g. a 6 µm thick PET-film can be interposed between the non-transparent microvoided film and the thermal head to prevent possible contamination of the thermal head. Thermal head printers, such as the DRYSTAR-printers supplied by AGFA-GEVAERT N.V., can be used produce the transparent pattern of the present invention e.g. as personalized watermarks.

This transparentization effect is accompanied by a relief pattern, which can be detected by touch i.e. in a tactile manner, and by changes in glossiness. This relief pattern is more pronounced the higher the temperature of the heat source e.g. in the case of A SAN-polymer as dispersed phase this embossing effect increasing with temperature between 110° C. and 190° C. The tactile relief obtained by applying a hot stamp to a non-transparent microvoided biaxially stretched self-supporting film is much more pronounced than that obtained using a thermal head.

The degree of transparency realized depends upon the stamp/thermal head printing conditions: time, temperature and pressure. The thermofixation history of the material is also important. The heated-induced transparentization of the non-transparent microvoided biaxially stretched self-supporting film can be carried out before or after the optional application of a layer, such as an ink-jet receiving layer and before or after transparentization. The relative positioning of the transparentized areas and transparency in the support can be of value as an additional security measure.

According to a second embodiment of the process for obtaining a transparent pattern, according to the present invention, the heat is applied non-continuously.

According to a third embodiment of the process for obtaining a transparent pattern, according to the present invention, a transparent overprintable layer is provided on the film prior to the image-wise application of heat.

According to a fourth embodiment of the process for obtaining a transparent pattern, according to the present invention, a transparent overprintable layer is provided on the film after the image-wise application of heat.

INDUSTRIAL APPLICATION

Non-transparent microvoided biaxially stretched films, according to the present invention, can be used as synthetic paper for printing and other applications, as a relector in LCD displays and photovoltaic devices, as a support for imaging materials e.g. impact and non-impact (e.g. electrophotography, electrography and ink jet) receiving materials, photothermographic recording materials, substantially light-insensitive thermographic recording materials, dye sublimation printing, thermal transfer printing, etc., in security and anti-counterfeiting applications e.g. in tickets, labels, tags, an ID-card, a bank card, a legal document, banknotes and packaging and can also be integrated into packaging.

The invention is illustrated hereinafter by way of comparative examples and examples. The percentages and ratios given in these examples are by weight unless otherwise indicated.

Subbing layer Nr. 01 on the emulsion side of the support:

| | |
|---|---|
| copolymer of 88% vinylidene chloride, 10% methyl acrylate and 2% itaconic acid | 79.1 mg/m² |
| Kieselsol ® 100F, a colloidal silica from BAYER | 18.6 mg/m² |
| Mersolat ® H, a surfactant from BAYER | 0.4 mg/m² |
| Ultravon ® W, a surfactant from CIBA-GEIGY | 1.9 mg/m² |

Ingredients used in the EXAMPLES:

Polyester:

| PET-nr | | | MFI 270° C./ 1.20 kg [cm³/10 min] | Inherent viscosity** [η] [dl/g] | $T_g$ [° C.] |
|---|---|---|---|---|---|
| 01 | T03* | polyethylene terephthalate | 34.8 | 0.60 | 80.5 |
| 02 | T04* | polyethylene terephthalate | 34.8 | 0.60 | 80.5 |
| 03 | WP75# | polyester of 98.5 mol % terephthalate, 1.5 mol % iso-phthalate and 100 mol % ethylene units | | 0.77 | 80 |
| 04 | DP9990# | polyester of 90 mol % terephthalate, 10 mol % iso-phthalate and 100 mol % ethylene units | | 0.60 | |
| 05 | DP9970# | polyester of 70 mol % terephthalate, 30 mol % iso-phthalate and 100 mol % ethylene units | | | |
| 06 | RADICRON 1480# | polyester of 100 mol % terephthalate, 73 mol % ethylene and 27 mol % neo-pentylene units | | | |

*AGFA-GEVAERT N.V.
La Seda
**inherent viscosity was determined in a 0.5 g/dL solution of 60 wt % phenol and 40 wt % ortho-dichlorobenzene at 25° C. in an Ubbelohde viscometer Styrene-Acrylonitrile Copolymers:

| SAN-nr | | Wt % acrylo-nitrile | Wt % styrene | MFI at 270° C./1.20 kg [mL/10 min] | Mn | Mw | $T_g$ [° C.] |
|---|---|---|---|---|---|---|---|
| 01 | TYRIL 905* | 20 | 80 | 7.1 | | | 105.2 |
| 02 | TYRIL 867E* | 25 | 75 | 5.8 | | | 106.5 |
| 03 | SAN 140* | 27.5 | 72.5 | 53.2 | 47,640 | 99,820 | 108.8 |
| 04 | LURAN 368R# | 28 | 72 | 3.9 | | | 107.3 |
| 05 | TYRIL 790* | 29 | 71 | 12.1 | | | 106.3 |
| 06 | SAN 124* | 28.5 | 71.5 | 37.9 | 53,940 | 109,350 | 108.1 |
| 07 | LURAN 388S# | 33 | 67 | 3.6 | | | 108.7 |

*DOW CHEMICAL
BASF
MFI = Melt Flow Index

MAGNUM 8391: an ABS resin with a Vicat softening temperature of 95° C. from DOW CHEMICAL TPX DX820: a high rigidity poly(4-methylpentene) from MITSUI CHEMICAL TITANIUM DIOXIDE: Renol-white/PTX 506, a masterbatch from CLARIANT GmbH containing 65% by weight $TiO_2$ and 35 wt % polyester

COMPARATIVE EXAMPLES 1 TO 3

The PET-types and SAN-types used for producing the extrudates used in producing of the films of COMPARATIVE EXAMPLES 1 to 3 are given in Table 1. The PET, SAN, $TiO_2$ and UVITEX OB-one in the weight percentages given in Table 3 were mixed and then dried at 150° C. for 4 hours under vacuum (<100 mbar), the mixtures then melted in a PET-extruder and extruded through a sheet die and cooled to produce the extrudates of COMPARATIVE EXAMPLES 1 to 3.

TABLE 1

| Comparative Example nr | PET01 [wt %] | PET02 [wt %] | PET03 [wt %] | SAN type | $TiO_2$ [wt %] | OB-one [ppm] |
|---|---|---|---|---|---|---|
| 1 | 98 | — | — | — | 2 | 150 |
| 2 | 47 | — | 47 | — | 6 | — |
| 3 | 44 | — | 44 | — | 12 | — |

The extrudates of COMPARATIVE EXAMPLES 1 to 3 were then longitudinally stretched with an INSTRON apparatus in which the extrudates are heated in an oven mounted on the apparatus under the conditions given in Table 2.

TABLE 2

| Comparative Example nr. | Stretch ratio | Stretch force [N/mm²] | Thickness [μm] | OD TR924 |
|---|---|---|---|---|
| 1/LS1 | 3.3 | 6.0 | 319 | 0.81 |
| 2/LS1 | 3.3 | 5.0 | 340 | 1.26 |
| 3/LS1 | 3.3 | 5.0 | 335 | 1.59 |

Transversal stretching was then performed on the longitudinally stretched films with a stretch time of 30 s and stretching speed of 1000%/min under the conditions given in Table 3.

Finally the films were thermally fixated at 175° C. for 1 minute giving the substantially opaque films of COMPARATIVE EXAMPLES 1/LS1, 2/LS2 and 3/LS3.

The optical densities of the films of COMPARATIVE EXAMPLES 1/LS1/BS1, 2/LS1/BS1 and 3/LS1/BS1 were measured in transmission mode with a MACBETH TR924 densitometer with a visible filter and the results given in Table 3.

TABLE 3

| Comparative Example nr. | Stretch ratio | Stretch temperature [° C.] | Thickness [μm] | OD (TR924) after thermal fixation |
|---|---|---|---|---|
| 1/LS1/BS1 | 3.3 | 135 | 120 | 0.45 |
| 2/LS1/BS1 | 3.3 | 135 | 140 | 0.90 |
| 3/LS1/BS1 | 3.3 | 135 | 135 | 1.12 |

* the higher the stretching tension the lower the stretch temperature

The films of COMPARATIVE EXAMPLES 1/LS/BS, 2/LS/BS and 3/LS/BS were each mounted in an Instron 4411 apparatus and were heated at various temperatures between 120 and 190° C. for 5 seconds with a soldering iron in the upper clamp making contact with the film at a pressure of 0.5 N/mm². The optical densities of the film after the tests were measured in transmission with a MacBeth TR924 densitometer with a visible filter and the film thicknesses were also measured. The results are summarized below in Tables 4 and 5 respectively.

TABLE 4

| Film of Comparative Example nr | OD before heating | OD after heating for 5 s at a pressure of 0.5 N/mm² at | | | | | ΔOD at 150° C. | % reduction in OD |
|---|---|---|---|---|---|---|---|---|
| | | 120° C. | 130° C. | 150° C. | 170° C. | 190° C. | | |
| 1/LS/BS | 0.45 | 0.47 | 0.46 | 0.46 | 0.47 | 0.45 | −0.01 | −0.01 |
| 2/LS/BS | 0.90 | 0.90 | 0.91 | 0.89 | 0.88 | 0.85 | 0.01 | 0.01 |
| 3/LS/BS | 1.12 | 1.14 | 1.14 | 1.11 | 1.11 | 1.08 | 0.01 | 0.01 |

TABLE 5

| Film of Comparative Example nr | Layer thickness before heating | Layer thickness after heating for 5 s at a pressure of 0.5 N/mm² at | | | | |
|---|---|---|---|---|---|---|
| | | 120° C. | 130° C. | 150° C. | 170° C. | 190° C. |
| 1/LS/BS | 93 | 92 | 91 | 93 | 92 | 85 |
| 2/LS/BS | 138 | 139 | 142 | 137 | 132 | 115 |
| 3/LS/BS | 137 | 136 | 135 | 139 | 131 | 119 |

Within experimental error no transparentization was observed upon heating the films of COMPARATIVE EXAMPLES 1/LS/BS, 2/LS/BS and 3/LS/BS. This shows that in the absence of dispersed SAN-polymer particles there is no transparentization of films containing titanium dioxide i.e. there is no micro-void formation.

COMPARATIVE EXAMPLE 4

The 1083 μm thick extrudate of COMPARATIVE EXAMPLE 4 with a composition of 2% by weight of titanium dioxide, 100 ppm UVITEX OB-one and 98% by weight of PET02 was produced as described for EXAMPLES 1 to 58 and had an optical density measured with a MacBeth TR924 densitometer in transmission mode with a visible filter of 1.35. The extrudate was stretched in the length direction as described in COMPARATIVE EXAMPLES 1 to 3 under the conditions given in Table 6. The thickness values were measured by averaging measurements obtained by contacting the upper surface at 16 different positions at a measuring force of 0.8N using a SONY U30A thickness gauge with a resolution of 1 μm, an accuracy of 2 μm and a contact ball 3 mm in diameter.

TABLE 6

| Comparative Example nr. | Stretch ratio | Stretch force [N/mm²] | Thickness [μm] | OD (TR924) | OD [X-rite] |
|---|---|---|---|---|---|
| 4/LS1 | 3.3 | 6 | 323 | 0.805 | 0.55 |
| 4/LS2 | 3.3 | 4 | 328 | 0.84 | — |

Transversal stretching was then performed on the longitudinally stretched films with a stretch time of 30 s and stretching speed of 1000%/min under the conditions given in Table 7. The measured thickness and measured optical density with the MacBeth TR924 densitometer in transmission mode with a visible filter are also given in Table 7.

TABLE 7

| Comparative Example nr. | Stretch ratio | Stretch temperature [° C.] | Thickness [μm] | OD TR924 | OD [X-rite] |
|---|---|---|---|---|---|
| 4/LS1/BS1 | 3.3 | 135 | 120 | 0.47 | 0.30 |
| 4/LS2/BS1 | 3.3 | 135 | 124 | 0.53 | 0.33 |

Since there is no contribution to the optical density from void-forming upon biaxial stretching for the composition of COMPARATIVE EXAMPLE 4 as can be seen from COMPARATIVE EXAMPLE 1 to 3, the dependence of optical density upon film thickness can be used to provide a baseline with which to assess the contribution of void-forming to the optical density for those compositions based upon aromatic polyesters with 2% by weight of the same titanium dioxide pigment which form voids upon biaxial stretching.

The Beer-Lambert relationship does not hold for pigmented films with light-scattering pigments such as titanium dioxide. If the film thickness is smaller than the average free path-length of the scattered light, light will escape after scattering otherwise the light does not escape and in fact interferes with further scattered light providing for a quasi-exponential dependence of optical density upon film thickness.

The situation is too complex to be able to be described theoretically and hence the only possible approach is to measure the actual optical density observed at particular film thicknesses. The above-mentioned optical density appear to a fair approximation to bee linearly dependent upon the logarithm of the film thickness in the layer thickness range 1084 to 120 μm giving the following relationship:

$OD = 0.891 \log [\text{thickness in } \mu m] - 1.3727$

This relationship provides the optical density attributable to a 2% by weight concentration of the titanium dioxide pigment used as a function of film thickness.

Examples 1 TO 18

The ca. 1100 μm thick extrudates of EXAMPLES 1 to 18 all with 2% by weight of titanium dioxide and 15% by weight of SAN 06 were produced by mixing the ingredients in Table 8 in the proportions given in Table 8 and then drying the mixture at 150° C. for 4 hours under vacuum (<100 mbar) before melting in a PET-extruder, extrusion through a sheet die and cooling to produce the extrudates of EXAMPLES 1 to 18 having a density of ca. 1.3 g/mL as summarized in Table 8 together with the isophthalate (IPA):terephthalate (TPA) ratio.

TABLE 8

| Invention example nr. | PET02 [wt %] | PET04 [wt %] | PET05 [wt %] | IPA:TPA ratio | SAN type | SAN [wt %] | UVITEX OB-one [ppm] | TiO$_2$ [wt %] | Density [g/mL] |
|---|---|---|---|---|---|---|---|---|---|
| 1 | 83 | 0 | — | 0 | 06 | 15 | — | 2.0 | 1.294 |
| 2 | 58 | 25 | — | 0.0310 | 06 | 15 | — | 2.0 | 1.289 |
| 3 | 41.5 | 41.5 | — | 0.0526 | 06 | 15 | 100 | 2.0 | 1.284 |
| 4 | 33.35 | 49.7 | — | 0.0636 | 06 | 15 | — | 1.95 | |
| 5 | 33.3 | 49.7 | — | 0.0637 | 06 | 15 | 100 | 2.0 | |
| 6 | 32.3 | 50.7 | — | 0.0650 | 06 | 15 | 100 | 2.0 | |
| 7 | 32.3 | 50.7 | — | 0.0650 | 06 | 15 | 100 | 2.0 | |
| 8 | 26.29 | 56.71 | — | 0.0733 | 06 | 15 | 100 | 2.0 | |
| 9 | 25.25 | 57.75 | — | 0.0748 | 06 | 15 | 100 | 2.0 | |
| 10 | 25 | 58 | — | 0.0751 | 06 | 15 | 100 | 2.0 | 1.304 |
| 11 | 24.3 | 58.7 | — | 0.0761 | 06 | 15 | 100 | 2.0 | |
| 12 | 1.05 | 82.0 | — | 0.109 | 06 | 15 | — | 1.95 | |
| 13 | — | 83 | — | 0.111 | 06 | 15 | — | 2.0 | 1.299 |
| 14 | — | 83 | — | 0.111 | 06 | 15 | 100 | 2.0 | |
| 15 | 28.25 | 22.3 | 32.5 | 0.168 | 06 | 15 | 100 | 1.95 | |
| 16 | 14.85 | 22.3 | 45.9 | 0.239 | 06 | 15 | — | 1.95 | |
| 17 | 1.05 | 22.3 | 59.7 | 0.320 | 06 | 15 | — | 1.95 | |
| 18 | 1.05 | — | 82.0 | 0.421 | 06 | 15 | — | 1.95 | |

Longitudinal stretching was carried out for each extrudate as described in COMPARATIVE EXAMPLES 1 to 3 under the conditions given in Table 9. The expected thickness is the thickness based on the extrudate thickness and longitudinal as observed for non-voided films.

Longitudinal stretching was accompanied by a decrease in density due to void-forming, this decrease in density clearly increasing as the IPA:TPA ratio increases, surprisingly indicates that an increase in the IPA:TPA ratio favours increased void-forming in the film.

TABLE 9

| Invention example nr | IPA:TPA ratio | Longitudinal stretch temperature [° C.] | ratio | V1 speed [m/min] | force [N/mm$^2$] | Density [g/mL] | Measured thickness [μm] | Expected thickness [μm] |
|---|---|---|---|---|---|---|---|---|
| 1/LS1 | 0 | | 3.85 | 4.0 | 8 | 1.290 | 320 | 286 |
| 2/LS1 | 0.0310 | | 3.85 | 4.0 | 8 | 1.264 | 325 | 286 |
| 2/LS2 | 0.0310 | | 3.65 | 4.0 | 8 | | 323 | 301 |
| 3/LS1 | 0.0526 | | 3.85 | 4.0 | 8 | 1.251 | 318 | 286 |
| 4/LS1 | 0.0636 | 92 | 3.3 | 4.0 | 8.0 | | 380 | 333 |
| 4/LS2 | 0.0636 | 80 | 3.3 | 4.0 | 9.0-9.5 | | 380 | 333 |
| 4/LS3 | 0.0636 | 108 | 3.3 | 8.0 | 7.5 | | 375 | 333 |
| 5/LS1 | 0.0637 | 101 | 3.3 | 4.0 | 8 | 1.216 | 350 | 333 |
| 5/LS2 | 0.0637 | 116 | 3.3 | 4.0 | 8 | 1.283 | 330 | 333 |
| 6/LS1 | 0.0650 | | 3.3 | 4.0 | 8.6 | | 365 | 333 |
| 7/LS1 | 0.0650 | 120 | 3.8 | 4.0 | 8 | | 300 | 290 |
| 7/LS2 | 0.0650 | 96 | 3.6 | 4.0 | 8 | | 335 | 305 |
| 7/LS3 | 0.0650 | 85 | 3.45 | 4.0 | 8 | | 350 | 319 |
| 8/LS1 | 0.0733 | 92 | 3.3 | 4.0 | 8 | 1.229 | 360 | 333 |

TABLE 9-continued

| Invention example nr | IPA:TPA ratio | Longitudinal stretch | | | | Density [g/mL] | Measured thickness [μm] | Expected thickness [μm] |
|---|---|---|---|---|---|---|---|---|
| | | temperature [° C.] | ratio | V1 speed [m/min] | force [N/mm²] | | | |
| 9/LS1 | 0.0748 | 95 | 3.3 | 4.0 | 8 | 1.242 | 330 | 333 |
| 10/LS1 | 0.0751 | | 3.85 | 4.0 | 8 | 1.217 | 330 | 286 |
| 11/LS1 | 0.0761 | 94 | 3.3 | 4.0 | 8 | 1.216 | 350 | 333 |
| 11/LS2 | 0.0761 | 110 | 3.3 | 4.0 | 7 | 1.258 | 333 | 333 |
| 12/LS1 | 0.109 | 96 | 3.3 | 4.0 | 8.0 | | 370 | 333 |
| 12/LS2 | 0.109 | 84 | 3.3 | 4.0 | 9.0-9.5 | | 385 | 333 |
| 13/LS1 | 0.111 | | 3.85 | 4.0 | 8 | 1.125 | 345 | 286 |
| 13/LS2 | 0.111 | | 3.65 | 4.0 | 8 | | 380 | 301 |
| 14/LS1 | 0.111 | | 3.85 | 4.0 | 8 | | 320 | 286 |
| 14/LS2 | 0.111 | | 3.85 | 4.0 | 5 | | | 286 |
| 14/LS3 | 0.111 | | 3.85 | 4.0 | 6 | | | 286 |
| 15/LS1 | 0.168 | 85 | 3.3 | 4.0 | 8.2 | | 393 | 333 |
| 16/LS1 | 0.239 | 86 | 3.3 | 4.0 | 6.0 | | 390 | 333 |
| 17/LS1 | 0.320 | 79 | 3.3 | 4.0 | 8.0 | | 392 | 327 |
| 17/LS2 | 0.321 | 85 | 3.3 | 4.0 | 7.0 | | 400 | 327 |
| 18/LS1 | 0.421 | 82 | 3.3 | 4.0 | 6.0 | | 375 | 333 |
| 18/LS2 | 0.421 | 87 | 3.3 | 4.0 | 5.0 | | 380 | 333 |

Table 10 gives the measured thickness; the expected thickness i.e. thickness if no void-forming on the basis of the extrudate thickness and the longitudinal and transversal stretch ratios, the measured optical density with the MacBeth TR924 densitometer in transmission mode with a visible filter, the expected optical density, i.e. the optical density calculated using the relationship disclosed in COMPARATIVE EXAMPLE 4 using the theoretical layer thickness values, and the difference between the observed optical density and the optical density expected due to a 2% by weight concentration of the particular titanium dioxide pigment used, ΔOD.

TABLE 10

| Invention example nr. | IPA:TPA ratio | Thickness [μm] | V1 speed [m/min] | Expected thickness [μm] | OD TR924 | Expected OD | ΔOD | ΔOD/OD | OD [X-rite] |
|---|---|---|---|---|---|---|---|---|---|
| 1/LS1 | 0 | 320 | 4.0 | 286 | 1.00 | 0.81 | 0.19 | 0.19 | 0.76 |
| 2/LS1 | 0.0310 | 325 | 4.0 | 286 | 1.05 | 0.81 | 0.24 | 0.23 | 0.82 |
| 2/LS2 | 0.0310 | 323 | 4.0 | 301 | 1.00 | 0.83 | 0.17 | 0.17 | 0.78 |
| 3/LS1 | 0.0526 | 318 | 4.0 | 286 | 1.06 | 0.81 | 0.25 | 0.23 | 0.85 |
| 4/LS1 | 0.0636 | 380 | 4.0 | 333 | 1.17 | 0.87 | 0.30 | 0.26 | 0.96 |
| 4/LS2 | 0.0636 | 380 | 4.0 | 333 | 1.15 | 0.87 | 0.28 | 0.24 | 0.97 |
| 4/LS3 | 0.0636 | 375 | 8.0 | 333 | 1.12 | 0.87 | 0.25 | 0.22 | 0.92 |
| 5/LS1 | 0.0637 | 350 | 4.0 | 333 | 1.21 | 0.87 | 0.34 | 0.28 | 0.98 |
| 5/LS2 | 0.0637 | 330 | 4.0 | 333 | 1.02 | 0.87 | 0.15 | 0.15 | 0.80 |
| 6/LS1 | 0.0650 | 365 | 4.0 | 333 | | 0.87 | | | |
| 7/LS1 | 0.0650 | 300 | 4.0 | 290 | | | | | |
| 7/LS2 | 0.0650 | 335 | 4.0 | 305 | | | | | |
| 7/LS3 | 0.0650 | 350 | 4.0 | 319 | | | | | |
| 8/LS1 | 0.0733 | 360 | 4.0 | 333 | 1.17 | 0.87 | 0.30 | 0.26 | 0.97 |
| 9/LS1 | 0.0748 | 330 | 4.0 | 333 | 1.08 | 0.87 | 0.21 | 0.19 | 0.90 |
| 10/LS1 | 0.0751 | 330 | 4.0 | 286 | 1.13 | 0.81 | 0.32 | 0.28 | 0.92 |
| 11/LS1 | 0.0761 | 350 | 4.0 | 333 | 1.18 | 0.87 | 0.31 | 0.26 | 1.00 |
| 11/LS2 | 0.0761 | 333 | 4.0 | 333 | 1.10 | 0.87 | 0.23 | 0.21 | 0.89 |
| 12/LS1 | 0.109 | 370 | 4.0 | 333 | 1.15 | 0.87 | 0.28 | 0.24 | 0.93 |
| 12/LS2 | 0.109 | 385 | 4.0 | 333 | 1.28 | 0.87 | 0.41 | 0.32 | 1.01 |
| 13/LS1 | 0.1111 | 345 | 4.0 | 286 | 1.20 | 0.81 | 0.39 | 0.32 | 1.02 |
| 13/LS2 | 0.1111 | 380 | 4.0 | 301 | 1.23 | 0.83 | 0.40 | 0.32 | 1.00 |
| 14/LS1 | 0.1111 | 320 | 4.0 | 286 | 1.24 | 0.81 | 0.43 | 0.35 | 1.00 |
| 14/LS2 | 0.1111 | | 4.0 | 286 | 1.02 | 0.81 | 0.21 | 0.20 | 0.83 |
| 14/LS3 | 0.1111 | | 4.0 | 286 | 1.10 | 0.81 | 0.29 | 0.26 | 0.83 |
| 15/LS1 | 0.168 | 393 | 4.0 | 333 | 1.15 | 0.87 | 0.28 | 0.24 | 0.97 |
| 16/LS1 | 0.239 | 390 | 4.0 | 333 | 1.12 | 0.87 | 0.25 | 0.22 | 0.91 |
| 17/LS1 | 0.320 | 392 | 4.0 | 327 | 1.37 | 0.87 | 0.50 | 0.36 | 1.10 |
| 17/LS2 | 0.320 | 400 | 4.0 | 327 | 1.10 | 0.87 | 0.23 | 0.21 | 0.89 |

TABLE 10-continued

| Invention example nr. | IPA:TPA ratio | Thickness [μm] | V1 speed [m/min] | Expected thickness [μm] | OD TR924 | Expected OD | ΔOD | ΔOD/OD | OD [X-rite] |
|---|---|---|---|---|---|---|---|---|---|
| 18/LS1 | 0.421 | 375 | 4.0 | 333 | 1.13 | 0.87 | 0.26 | 0.23 | 0.76 |
| 18/LS2 | 0.421 | 380 | 4.0 | 333 | 0.97 | 0.87 | 0.10 | 0.10 | 0.89 |

Longitudinal stretching was accompanied by a decrease in density due to void-forming, this decrease in density clearly increasing as the proportion of PET04 increased i.e. surprisingly indicates that an increase in the isophthalic acid unit concentration in the aromatic polyester favours increased void-forming in the film. The increase in optical density due to void forming was in the range of 17 to 36.

Transversal stretching was then performed on the longitudinally stretched films with a stretch time of 30 S and stretching speed of 1000%/min under the conditions given in Table 11. The density, measured thickness and the expected thickness, i.e. thickness if no void-forming on the basis of the extrudate thickness and the longitudinal and transversal stretch ratios, are also given in Table 11.

Transversal stretching reduced the density of the films still further with again the density decrease being greater as the proportion of PET04 increased. This again surprisingly indicates that an increase in the isophthalic acid unit concentration in the aromatic polyester favoured increased void-forming in the film. The decrease in density is smaller than would be expect simply based on the measured thicknesses compared with the expected thicknesses for non-voided films.

At an IPA:TPA ratio of 0.0650 transversal stretching was surprisingly not possible above 113° C., but was possible at as low temperatures as 85° C., which is less than 10° C. above the glass transition temperature of the linear polyester matrix. This enables much higher optical densities to be realized by biaxial stretching.

TABLE 11

| Invention example nr | IPA:TPA ratio | Transversal stretch temperature [° C.] | ratio | speed [%/min] | Measured Density [g/mL] | thickness [μm] | Expected thickness [μm] |
|---|---|---|---|---|---|---|---|
| 1/LS1/BS1 | 0 | 135 | 3.3 | 1000 | 1.284 | 101 | 87 |
| 2/LS1/BS1 | 0.031 | 134 | 3.3 | 1000 | 1.219 | 95 | 87 |
| 2/LS2/BS1 | 0.031 | 135 | 3.3 | 1000 |  | 102 | 91 |
| 3/LS1/BS1 | 0.0526 | 132 | 3.3 | 1000 |  | 100 | 87 |
| 3/LS1/BS2 | 0.0526 |  |  | 1000 | 1.234 | 97 | 87 |
| 4/LS1/BS1 | 0.0636 | 100 | 3.5 | 1000 |  | 145 | 95 |
| 4/LS2/BS1 | 0.0636 | 105 | 3.5 | 1000 |  | 150 | 95 |
| 4/LS3/BS1 | 0.0636 | 95 | 3.5 | 1000 |  | 126 | 95 |
| 5/LS1/BS1 | 0.0637 | 100 | 3.5 | 1000 | 1.074 | 140 | 95 |
| 5/LS1/BS2 | 0.0637 | 96 | 3.5 | 1000 | 1.002 | 135 | 95 |
| 5/LS2/BS1 | 0.0637 | 96 | 3.5 | 1000 | 1.158 | 116 | 95 |
| 6/LS1/BS1 | 0.0650 | 132 | 3.3 | 1000 | 1.228 | 140 | 101 |
| 7/LS1/BS1 | 0.0650 | 122 | 3.3 | 1000 |  | 110 | 88 |
| 7/LS2/BS1 | 0.0650 | 122 | 3.3 | 1000 |  | 135 | 93 |
| 7/LS3/BS1 | 0.0650 | 122 | 3.3 | 1000 |  | 150 | 97 |
| 8/LS1/BS1 | 0.0733 | 95 | 3.5 | 1000 | 1.071 | 145 | 95 |
| 9/LS1/BS1 | 0.0748 | 96 | 3.5 | 1000 | 1.070 | 138 | 95 |
| 10/LS1/BS1 | 0.0751 | 134 | 3.3 | 1000 | 1.195 | 105 | 87 |
| 11/LS1/BS1 | 0.0761 | 95 | 3.5 | 1000 | 1.055 | 147 | 95 |
| 11/LS2/BS1 | 0.0761 | 95 | 3.5 | 1000 | 1.140 | 112 | 95 |
| 12/LS1/BS1 | 0.109 | 92 | 3.5 | 1000 |  | 207 | 95 |
| 12/LS1/BS2 | 0.109 | 85 | 3.5 | 1000 |  | 199 | 95 |
| 12/LS1/BS3 | 0.109 | 83 | 3.5 | 1000 |  | 198 | 95 |
| 12/LS2/BS1 | 0.109 | 92 | 3.5 | 1000 |  | 205 | 95 |
| 12/LS2/BS2 | 0.109 | 85 | 3.5 | 1000 |  | 210 | 95 |
| 12/LS2/BS3 | 0.109 | 81 | 3.5 | 1000 |  | 214 | 95 |
| 13/LS1/BS1 | 0.1111 | 135 | 3.3 | 1000 | 0.990 | 169 | 87 |
| 13/LS2/BS1 | 0.1111 | 135 | 3.3 | 1000 |  | 185 | 91 |
|  |  |  |  |  |  | 156 |  |
| 14/LS1/BS1 | 0.1111 | 110 | 3.3 | 1000 | 1.121 | 130 | 86 |
| 14/LS2/BS1 | 0.1111 | 110 | 3.3 | 1000 |  | 125 | 86 |
| 14/LS3/BS1 | 0.1111 | 110 | 3.3 | 1000 |  | 120 | 86 |
| 15/LS1/BS1 | 0.168 | 89 | 3.5 | 1000 |  | 198 | 95 |
| 15/LS1/BS2 | 0.168 | 84 | 3.5 | 1000 |  | 201 | 95 |
| 15/LS1/BS3 | 0.168 | 78 | 3.5 | 1000 |  | 204 | 95 |
| 16/LS1/BS1 | 0.239 | 89 | 3.5 | 1000 |  | 191 | 95 |
| 16/LS1/BS2 | 0.239 | 84 | 3.5 | 1000 |  | 186 | 95 |
| 17/LS1/BS1 | 0.320 | 92 | 3.5 | 1000 |  | 211 | 95 |
| 17/LS1/BS2 | 0.320 | 86 | 3.5 | 1000 |  | 210 | 95 |
| 17/LS2/BS1 | 0.320 | 92 | 3.5 | 1000 |  | 190 | 95 |
| 17/LS2/BS2 | 0.320 | 86 | 3.5 | 1000 |  | 200 | 95 |
| 18/LS1/BS1 | 0.421 | 92 | 3.5 | 1000 |  | 190 | 95 |
| 18/LS1/BS2 | 0.421 | 90 | 3.5 | 1000 |  | 170 | 95 |

TABLE 11-continued

| Invention example nr | IPA:TPA ratio | Transversal stretch temperature [° C.] | ratio | speed [%/min] | Density [g/mL] | Measured thickness [μm] | Expected thickness [μm] |
|---|---|---|---|---|---|---|---|
| 18/LS1/BS3 | 0.421 | 85 | 3.5 | 1000 | | 170 | 95 |
| 18/LS2/BS1 | 0.421 | 92 | 3.5 | 1000 | | 150 | 95 |
| 18/LS2/BS2 | 0.421 | 85 | 3.5 | 1000 | | 150 | 95 |

Table 12 gives the measured thickness, the expected thickness, the measured optical density with the MacBeth TR924 densitometer in transmission mode with a visible filter, the expected optical density, i.e. the optical density calculated using the relationship disclosed in COMPARATIVE EXAMPLE 4 using the theoretical layer thickness values, and the difference between the observed optical density and the optical density expected due to a 2% by weight concentration of the particular titanium dioxide pigment used, ΔOD.

TABLE 12

| Invention example nr | IPA:TPA ratio | LS speed [m/min] | Thickness [μm] | Expected thickness [μm] | OD TR924 | Expected OD | ΔOD | ΔOD/OD | OD [X-rite] |
|---|---|---|---|---|---|---|---|---|---|
| 1/LS1/BS1 | 0 | 4.0 | 101 | 87 | 1.00 | 0.35 | 0.65 | 0.65 | 0.78 |
| 2/LS1/BS1 | 0.0310 | 4.0 | 95 | 87 | 1.01 | 0.35 | 0.66 | 0.65 | 0.78 |
| 2/LS2/BS1 | 0.0310 | 4.0 | 102 | 91 | 0.99 | 0.37 | 0.62 | 0.63 | 0.75 |
| 3/LS1/BS1 | 0.0526 | 4.0 | 100 | 87 | 1.04 | 0.35 | 0.69 | 0.66 | 0.80 |
| 3/LS1/BS2 | 0.0526 | 4.0 | 97 | 87 | (1.04) | (0.35) | (0.69) | 0.66 | (0.80) |
| 4/LS1/BS1 | 0.0636 | 4.0 | 145 | 95 | 1.02 | 0.39 | 0.63 | 0.62 | 0.85 |
| 4/LS2/BS1 | 0.0636 | 4.0 | 150 | 95 | 1.11 | 0.39 | 0.72 | 0.65 | 0.90 |
| 4/LS3/BS1 | 0.0636 | 8.0 | 126 | 95 | 1.03 | 0.39 | 0.64 | 0.62 | 0.77 |
| 5/LS1/BS1 | 0.0637 | 4.0 | 140 | 95 | 1.20 | 0.39 | 0.81 | 0.67 | 0.97 |
| 5/LS1/BS2 | 0.0637 | 4.0 | 135 | 95 | 1.25 | 0.39 | 0.86 | 0.69 | 1.00 |
| 5/LS2/BS1 | 0.0637 | 4.0 | 116 | 95 | 1.10 | 0.39 | 0.71 | 0.64 | 0.86 |
| 6/LS1/BS1 | 0.0650 | 4.0 | 140 | 101 | 1.10 | 0.41 | 0.69 | 0.63 | 0.85 |
| 7/LS1/BS1 | 0.0650 | 4.0 | 110 | 88 | 1.06 | 0.36 | 0.70 | 0.66 | 0.84 |
| 7/LS2/BS1 | 0.0650 | 4.0 | 135 | 93 | 1.18 | 0.38 | 0.80 | 0.68 | 0.94 |
| 7/LS3/BS1 | 0.0650 | 4.0 | 150 | 97 | 1.11 | 0.40 | 0.71 | 0.64 | 0.88 |
| 8/LS1/BS1 | 0.0733 | 4.0 | 145 | 95 | 1.21 | 0.39 | 0.82 | 0.68 | 0.94 |
| 9/LS1/BS1 | 0.0748 | 4.0 | 138 | 95 | 1.20 | 0.39 | 0.81 | 0.67 | 0.97 |
| 10/LS1/BS1 | 0.0751 | 4.0 | 105 | 87 | 1.10 | 0.35 | 0.75 | 0.68 | 0.90 |
| 11/LS1/BS1 | 0.0761 | 4.0 | 147 | 95 | 1.20 | 0.39 | 0.81 | 0.67 | 0.97 |
| 11/LS2/BS1 | 0.0761 | 4.0 | 112 | 95 | 1.05 | 0.39 | 0.66 | 0.63 | 0.82 |
| 12/LS1/BS1 | 0.109 | 4.0 | 207 | 95 | 1.26 | 0.39 | 0.87 | 0.69 | 1.04 |
| 12/LS1/BS2 | 0.109 | 4.0 | 199 | 95 | 1.28 | 0.39 | 0.89 | 0.69 | 1.04 |
| 12/LS1/BS3 | 0.109 | 4.0 | 198 | 95 | 1.27 | 0.39 | 0.88 | 0.69 | 1.03 |
| 12/LS2/BS1 | 0.109 | 4.0 | 205 | 95 | 1.34 | 0.39 | 0.95 | 0.71 | 1.12 |
| 12/LS2/BS2 | 0.109 | 4.0 | 210 | 95 | 1.34 | 0.39 | 0.95 | 0.71 | 1.08 |
| 12/LS2/BS3 | 0.109 | 4.0 | 214 | 95 | 1.35 | 0.39 | 0.96 | 0.71 | 1.11 |
| 13/LS1/BS1 | 0.111 | 4.0 | 169 | 87 | 1.32 | 0.35 | 0.97 | 0.73 | 1.06 |
| 13/LS2/BS1 | 0.111 | 4.0 | 185 156 | 91 | 1.26 | 0.37 | 0.89 | 0.71 | 1.00 |
| 14/LS1/BS1 | 0.111 | 4.0 | 130 | 86 | 1.24 | 0.35 | 0.89 | 0.72 | 1.00 |
| 14/LS2/BS1 | 0.111 | 4.0 | 125 | 86 | 0.95 | 0.35 | 0.60 | 0.63 | 0.74 |
| 14/LS3/BS1 | 0.111 | 4.0 | 120 | 86 | 0.98 | 0.35 | 0.63 | 0.64 | 0.74 |
| 15/LS1/BS1 | 0.168 | 4.0 | 198 | 95 | 1.30 | 0.39 | 0.91 | 0.70 | 1.05 |
| 15/LS1/BS2 | 0.168 | 4.0 | 201 | 95 | 1.28 | 0.39 | 0.89 | 0.69 | 1.04 |
| 15/LS1/BS3 | 0.168 | 4.0 | 204 | 95 | 1.30 | 0.39 | 0.91 | 0.70 | 1.08 |
| 16/LS1/BS1 | 0.239 | 4.0 | 191 | 95 | 1.20 | 0.39 | 0.81 | 0.67 | 0.99 |
| 16/LS1/BS2 | 0.239 | 4.0 | 186 | 95 | 1.19 | 0.39 | 0.80 | 0.67 | 0.97 |
| 17/LS1/BS1 | 0.320 | 4.0 | 211 | 95 | 1.26 | 0.39 | 0.87 | 0.69 | 1.00 |
| 17/LS1/BS2 | 0.320 | 4.0 | 210 | 95 | 1.30 | 0.39 | 0.91 | 0.70 | 1.08 |
| 17/LS2/BS1 | 0.320 | 4.0 | 190 | 95 | 1.19 | 0.39 | 0.80 | 0.67 | 0.95 |
| 17/LS2/BS2 | 0.320 | 4.0 | 200 | 95 | 1.21 | 0.39 | 0.82 | 0.68 | 0.98 |
| 18/LS1/BS1 | 0.421 | 4.0 | 190 | 95 | 1.14 | 0.39 | 0.75 | 0.66 | 0.91 |
| 18/LS1/BS2 | 0.421 | 4.0 | 170 | 95 | 1.14 | 0.39 | 0.75 | 0.66 | 0.90 |
| 18/LS1/BS3 | 0.421 | 4.0 | 170 | 95 | 1.16 | 0.39 | 0.77 | 0.66 | 0.91 |
| 18/LS2/BS1 | 0.421 | 4.0 | 150 | 95 | 1.03 | 0.39 | 0.64 | 0.62 | 0.81 |
| 18/LS2/BS2 | 0.421 | 4.0 | 150 | 95 | 1.07 | 0.39 | 0.68 | 0.63 | 0.83 |

The results of Table 12 show that at approximately the same stretching temperature the contribution to the optical density of biaxially stretched films of microvoiding increases to over 70% as the IPA:TPA ratio increases to 0.132. Above an IPA:TPA ratio of 0.132 there is a steady decrease to a still considerable contribution of 0.66 at an IPA:TPA ratio of 0.421, corresponding to 30 mole % isophthalate.

The presence of void-forming was demonstrated for several of the biaxially stretched films by clamping the films in an Instron 4411 apparatus and observing the changes in film thickness and optical density upon contacting the films with a soldering iron for 5 s at 150° C. The results of these experiments are given in Table 13.

TABLE 13

| Example nr. | OD (TR924) before heating | Thickness before heating [μm] | after heating at 150° C. for 5 s at pressure of 0.5 N/mm² OD (TR924) | after heating at 150° C. for 5 s at pressure of 0.5 N/mm² thickness [μm] | % decrease in OD | Change in thickness at 150° C. [μm] |
|---|---|---|---|---|---|---|
| 1/LS1/BS1 | 1.03 | 103 | 0.62 | 94 | 40 | 9 |
| 3/LS1/BS2 | 1.05 | 97 | 0.58 | 87 | 45 | 10 |
| 10/LS1/BS1 | 1.14 | 106 | 0.53 | 84 | 53 | 22 |
| 13/LS1/BS1 | 1.34 | 168 | 0.83 | 110 | 38 | 58 |
| 13/LS2/BS1 | 1.25 | 156 | 0.65 | 112 | 48 | 44 |

Example 19

The 1100 μm thick extrudate of EXAMPLE 19 having a composition of 2% by weight of titanium dioxide, 100 ppm of UVITEX OB-one [ppm], 15% by weight of SAN 06 and 83% by weight of PET04 was produced as described for EXAMPLES 1 to 58. Stretching in the length direction was carried out for the extrudate as described in COMPARATIVE EXAMPLES 1 to 3 under four different sets of conditions as given in Table 14. The expected thickness is the thickness based on the extrudate thickness and longitudinal as observed for non-voided films.

TABLE 14

| Invention Example nr. | Longitudinal stretch ratio | Longitudinal stretch force [N/mm²] | temperature [° C.] | Thickness Measured [μm] | Thickness Expected [μm] | OD [X-rite] |
|---|---|---|---|---|---|---|
| 19/LS1 | 3.8 | 8.3 | 120 | 300 | 290 | 0.94 |
| 19/LS2 | 3.6 | 8.23 | 96 | 330 | 305 | 0.96 |
| 19/LS3 | 3.3 | 8.6 | 90 | 365 | 333 | |
| 19/LS4 | 3.1 | 8.2 | 80 | 380 | 355 | |

Transversal stretching was then performed on the longitudinally stretched films as described in COMPARATIVE EXAMPLES 1 to 3 under the conditions given in Table 15. The density, measured thickness and the expected thickness, i.e. thickness if no void-forming on the basis of the extrudate thickness and the longitudinal and transversal stretch ratios, are also given in Table 15.

Biaxial stretching reduced the density of the films with the density decrease being greater the lower the transversal stretching temperature. However, the decrease in density is smaller than would be expect simply based on the measured thicknesses compared with the expected thicknesses based on the extrudate thickness, longitudinal stretch ratio and transversal stretch ratio as observed for non-voided films, which can only be partly explained by the combination of two effects: the decrease in the density due to void forming on the one hand being to a degree compensated by the increase in the crystallinity of the polyester matrix due to biaxial stretching on the other.

TABLE 15

| Example nr. | Transversal stretch ratio | Transversal stretch temperature [° C.] | Transversal stretch time [s] | Transversal stretch speed [%/min] | Density [g/mL] | Thickness Measured [μm] | Thickness Expected [μm] |
|---|---|---|---|---|---|---|---|
| 19/LS3/BS1 | 3.3 | 86 | 30 | 1000 | 0.984 | 199 | 101 |
| 19/LS3/BS2 | 3.3 | 91 | 30 | 1000 | 0.978 | 185 | 101 |
| 19/LS3/BS3 | 3.3 | 98 | 30 | 1000 | 0.993 | 180, 190 | 101 |
| 19/LS3/BS4 | 3.3 | 100 | 30 | 1000 | 1.117 | 165 | 101 |
| 19/LS3/BS5 | 3.3 | 100 | 30 | 1000 | | 150 | 101 |
| 19/LS3/BS6 | 3.5 | 100 | 30 | 1000 | 1.080 | 175 | 95 |
| 19/LS3/BS7 | | 101 | 30 | 1000 | | 105 | 101 |
| 19/LS3/BS8 | | 102 | 30 | 1000 | | 135 | 101 |
| 19/LS2/BS1 | 3.3 | 106 | 30 | 1000 | | 135 | 93 |
| 19/LS3/BS9 | 3.3 | 110 | 30 | 1000 | | 150 | 101 |
| 19/LS4/BS1 | 3.3 | 110 | 30 | 1000 | | 165 | 108 |
| 19/LS2/BS2 | 3.3 | 113 | 30 | 1000 | | 135 | 93 |
| 19/LS1/BS1 | 3.3 | 114 | 30 | 1000 | | 110 | 88 |
| 19/LS3/BS10 | 3.3 | 121 | 30 | 1000 | 1.199 | 150 | 101 |
| 19/LS2/BS3 | 3.3 | 123 | 30 | 1000 | | 120 | 93 |
| 19/LS3/BS11 | 3.3 | 128 | 30 | 1000 | 1.221 | 140 | 101 |
| 19/LS3/BS12 | 3.3 | 132 | 30 | 1000 | 1.228 | 140 | 101 |
| 19/LS3/BS13 | 3.3 | 142 | 30 | 1000 | 1.242 | 140 | 101 |
| 19/LS4/BS2 | | 150 | | | | 162 | 108 |
| 19/LS3/BS14 | 3.3 | 153 | 30 | 1000 | 1.235 | 140 | 101 |
| 19/LS3/BS15 | 3.5 | 111 | 30 | 2000 | 1.132 | 140 | 95 |
| 19/LS3/BS16 | | 110 | 10 | 1000 | | 152 | 101 |
| 19/LS3/BS17 | 3.3 | 100 | 30 | 500 | 1.062 | 180 | 101 |
| 19/LS3/BS18 | 3.5 | 100 | 30 | 500 | 1.080 | 190 | 95 |

Table 16 gives the measured thickness, the expected thickness, i.e. thickness if no void-forming on the basis of the extrudate thickness and the longitudinal and transversal stretch ratios, the optical density measured with a MacBeth TR924 densitometer in transmission mode with a visible filter, the expected optical density, i.e. the optical density calculated using the relationship disclosed in COMPARATIVE EXAMPLE 4 using the theoretical layer thickness values, and the difference between the observed optical density and the optical density expected due to a 2% by weight concentration of the particular titanium dioxide pigment used, ΔOD, together with the temperature at which the transversal stretching was carried out.

TABLE 16

| Example nr. | Stretch temperature [° C.] | Thickness Measured [μm] | Thickness Expected [μm] | OD TR924 | Expected OD | ΔOD | ΔOD/OD | OD (X-rite) |
|---|---|---|---|---|---|---|---|---|
| 19/LS3/BS1 | 86 | 199 | 101 | 1.35 | 0.41 | 0.95 | 0.70 | 1.10 |
| 19/LS3/BS2 | 91 | 185 | 101 | 1.32 | 0.41 | 0.91 | 0.69 | 1.07 |
| 19/LS3/BS3 | 98 | 180 | 101 | 1.28 | 0.41 | 0.87 | 0.68 | 1.03 |
|  |  | 190 |  | 1.36 |  | 0.95 | 0.70 |  |
| 19/LS3/BS4 | 100 | 165 | 101 | 1.20 | 0.41 | 0.79 | 0.66 | 0.96 |
| 19/LS3/BS5 | 100 | 150 | 101 | 1.22 | 0.41 | 0.81 | 0.66 | 1.00 |
| 19/LS3/BS6 | 100* | 175 | 95 | 1.22 | 0.39 | 0.83 | 0.68 | 0.98 |
| 19/LS3/BS7 | 101 | 105 | 101 | 1.15 | 0.41 | 0.75 | 0.65 | 0.90 |
| 19/LS3/BS8 | 102 | 135 | 101 | 1.08 | 0.41 | 0.67 | 0.62 | 0.81 |
| 19/LS2/BS1 | 106 | 135 | 93 |  | 0.38 |  |  | 1.005 |
| 19/LS3/BS9 | 110 | 150 | 101 |  | 0.41 |  |  | 0.94 |
| 19/LS4/BS1 | 110 | 165 | 108 | 1.18 | 0.44 | 0.74 | 0.63 | 0.91 |
| 19/LS2/BS2 | 113 | 135 | 93 | 1.17 | 0.38 | 0.79 | 0.67 | 0.905 |
| 19/LS1/BS1 | 114 | 110 | 88 | 1.01 | 0.36 | 0.65 | 0.64 | 0.805 |
| 19/LS3/BS10 | 121 | 150 | 101 | 1.14 | 0.41 | 0.73 | 0.64 | 0.89 |
| 19/LS2/BS3 | 123 | 120 | 93 |  | 0.38 |  |  | 0.88 |
| 19/LS3/BS11 | 128 | 140 | 101 | 1.10 | 0.41 | 0.69 | 0.63 | 0.86 |
| 19/LS3/BS12 | 132 | 140 | 101 | 1.10 | 0.41 | 0.69 | 0.63 | 0.85 |
| 19/LS3/BS13 | 142 | 140 | 101 | 1.10 | 0.41 | 0.69 | 0.63 | 0.83 |
| 19/LS4/BS2 | 150 | 162 | 108 |  | 0.44 |  |  | 0.85 |
| 19/LS3/BS17 | 153 | 140 | 101 | 1.10 | 0.41 | 0.69 | 0.63 | 0.86 |

*stretch ratio = 3.5

It is clear from the results in Table 16 that the degree of void-forming, as indicated by the optical density not attributable to the 2% by weight of titanium dioxide present, increased up to 70% with decreasing transversal stretch temperature regardless of the other conditions pertaining during the transversal stretch process.

Table 17 summarizes the stretch conditions, the thickness, expected thickness based on the extrudate thickness, the longitudinal stretch ratio and the transversal stretch ratio, optical density, expected optical density and non-attibutable increase in optical density as a result of void-forming for different films obtained at a stretch temperature of approximately 110° C.

The data in Table 17 shows that reducing the stretching time from 30 s to 10 s and increasing the stretching speed from 1000%/min to 2000%/min also promote void-forming.

TABLE 17

| EXAMPLE nr. | Transversal stretch temperature [° C.] | time [s] | speed [%/min] | Thickness Measured [μm] | Thickness Expected [μm] | OD TR924 | Expected OD | ΔOD | ΔOD/OD | OD (X-rite) |
|---|---|---|---|---|---|---|---|---|---|---|
| 19/LS3/BS15 | 111 | 30 | 2000 | 140 | 95 | 1.20 | 0.39 | 0.81 | 0.67 | 0.95 |
| 19/LS3/BS9 | 110 | 30 | 1000 | 150 | 101 |  | 0.41 |  |  | 0.94 |
| 19/LS4/BS1 | 110 | 30 | 1000 | 165 | 108 | 1.18 | 0.44 | 0.74 | 0.63 | 0.91 |
| 19/LS3/BS16 | 110 | 10 | 1000 | 152 | 101 | 1.22 | 0.41 | 0.81 | 0.66 | 1.00 |
| 19/LS3/BS17 | 100 | 30 | 500 | 180 | 101 | 1.21 | 0.41 | 0.80 | 0.66 | 0.99 |
| 19/LS3/BS18* | 100 | 30 | 500 | 190 | 95 | 1.23 | 0.39 | 0.84 | 0.68 | 1.01 |

*stretch ratio = 3.5

The presence of void-forming was demonstrated for the biaxially stretched film of EXAMPLE 19/LS1/BS1 by clamping the film in an Instron 4411 apparatus and observing the changes in film thickness and optical density upon contacting the film with a soldering iron for 5 s at various temperatures. The results of these experiments are given in Tables 18 and 19.

TABLE 18

| Invention Example nr | OD before heating | OD (TR924) after heating for 5 s at a pressure of 0.5 N/mm$^2$ at | | | | | ΔOD at 150° C. | % decrease in OD |
|---|---|---|---|---|---|---|---|---|
| | | 122° C. | 130° C. | 150° C. | 170° C. | 190° C. | | |
| 19/LS1/BS1 | 1.36 | 1.18 | 1.12 | 1.02 | 0.82 | 0.72 | 0.42 | 25 |

TABLE 19

| EXAMPLE nr | Film thickness before heating [μm] | Film thickness [μm] after heating for 5 s at a pressure of 0.5 N/mm$^2$ at | | | | |
|---|---|---|---|---|---|---|
| | | 122° C. | 130° C. | 150° C. | 170° C. | 190° C. |
| 19/LS1/BS1 | 199 | 163 | 157 | 147 | 139 | 145 |

A reduction in optical density at 150° C. of 0.42 was observed for the film of EXAMPLE 19/LS1/BS1 corresponding to 25% accompanied by a reduction of 26% in layer thickness.

Examples 20 TO 24

The ca. 1100 μm thick extrudates of EXAMPLES 20 to 24 all with 2% by weight of titanium dioxide and 15% by weight of SAN were produced as described for COMPARATIVE EXAMPLES 1 to 3 with 15% by weight of SAN or 15% by weight of ABS (MAGNUM 8391) and different weight ratios of PET02 and PET04 as summarized in Table 20.

TABLE 20

| Example nr. | PET02 [wt %] | PET04 [wt %] | MAGNUM 8391 [% by wt] | SAN 06 [wt %] | UVITEX OB-one [ppm] | TiO$_2$ [wt %] |
|---|---|---|---|---|---|---|
| 20 | 83 | 0 | 15 | — | — | 2.0 |
| 21 | 41.2 | 41.8 | — | 15 | 100 | 2.0 |
| 22 | 32.3 | 50.7 | — | 15 | 100 | 2.0 |
| 23 | 32 | 51 | — | 15 | 100 | 2.0 |
| 24 | — | 83 | — | 15 | 100 | 2.0 |

Stretching in the length direction was carried out for each extrudate as described in COMPARATIVE EXAMPLES 1 to 3 under the conditions given in Table 21. The expected thickness is the thickness based on the extrudate thickness and longitudinal as observed for non-voided films.

TABLE 21

| Example nr. | Longitudinal stretch | | | Thickness | | OD TR924 | Expected OD | ΔOD | ΔOD/OD | OD [X-rite] |
|---|---|---|---|---|---|---|---|---|---|---|
| | ratio | force [N/mm$^2$] | temperature [° C.] | Measured [μm] | Expected [μm] | | | | | |
| 20/LS1 | 3.6 | 8 | — | 318 | 305 | 0.84 | 0.84 | 0.00 | | 0.60 |
| 21/LS1* | 3.3 | 7.97 | | 375 | 333 | 1.08 | 0.87 | 0.21 | 0.19 | 0.96 |
| 21/LS2* | 3.3 | 7.14 | | 333 | 333 | 0.948 | 0.87 | 0.078 | 0.08 | 0.86 |
| 21/LS3* | 3.3 | 9.67 | | 333 | 333 | 1.19 | 0.87 | 0.32 | 0.27 | 1.09 |
| 22/LS1 | 3.8 | 8.3 | 120 | 300 | 290 | 0.82 | | | | 0.94 |
| 22/LS2 | 3.6 | 8.23 | 96 | 330 | 305 | 0.84 | | | | 0.96 |
| 22/LS3 | 3.3 | 8.6 | 90 | 365 | 333 | 0.87 | | | | |
| 22/LS4 | 3.1 | 8.2 | 80 | 380 | 355 | 0.90 | | | | |
| 23/LS1 | 3.6 | 8.23 | 114 | 330 | 305 | 1.26 | 0.84 | 0.42 | 0.33 | 0.96 |
| 24/LS1 | 3.85 | 8 | — | 320 | 286 | 1.24 | 0.81 | 0.43 | 0.35 | 1.00 |

*stretching speed 4.0 m/min

Transversal stretching was then performed on the longitudinally stretched films with a stretch time of 30 s and stretching speed of 1000%/min as under the conditions given in Table 22. The measured thickness, the expected thickness, i.e. thickness if no void-forming on the basis of the extrudate thickness and the longitudinal and transversal stretch ratios, the measured optical density with the MacBeth TR924 densitometer in transmission mode with a visible filter, the expected optical density, i.e. the optical density calculated using the relationship disclosed in COMPARATIVE EXAMPLE 4 using the theoretical layer thickness values, and the difference between the observed optical density and the optical density expected due to a 2% by weight concentration of the particular titanium dioxide pigment used, ΔOD, are also given in Table 22.

TABLE 22

| Example nr. | Transverse stretch ratio | temperature [° C.] | Density [g/mL] | Thickness Measured [μm] | Thickness Expected [μm] | OD TR924 | Expected OD | ΔOD | ΔOD/OD |
|---|---|---|---|---|---|---|---|---|---|
| 20/LS1/BS1 | 3.3 | 112 | | 65 85 | 88 | 0.73 | 0.36 | 0.37 | 0.50 |
| 21/LS1/BS1 | 3.5 | 115 | 1.19 | 140 | 95 | 0.925 | 0.39 | 0.535 | 0.58 |
| 21/LS1/BS2 | 3.5 | 100 | 1.08 | 116 | 95 | 1.05 | 0.39 | 0.66 | 0.63 |
| 21/LS2/BS1 | 3.5 | 100 | 1.17 | 123 | 95 | 1.01 | 0.39 | 0.62 | 0.61 |
| 22/LS1/BS1 | 3.3 | 114 | | 110 | 88 | 1.01 | 0.36 | 0.65 | 0.64 |
| 22/LS2/BS1 | 3.3 | 113 | | 135 | 93 | 1.17 | 0.38 | 0.69 | 0.59 |
| 22/LS3/BS1* | 3.5 | 111 | 1.132 | 140 | 95 | 1.20 | 0.39 | 0.81 | 0.67 |
| 22/LS4/BS1 | 3.3 | 110 | | 165 | 108 | 1.18 | 0.44 | 0.74 | 0.63 |
| 23/LS1/BS1 | 3.3 | 110 | | 125 | 101 | 1.10 | 0.41 | 0.69 | 0.63 |
| 24/LS1/BS1 | 3.3 | 110 | 1.121 | 100 | 87 | 1.20 | 0.35 | 0.85 | 0.71 |

*stretching speed of 2000 %/min

The increase in optical density due to void-forming clearly increased as the percentage of PET 04 in the continuous phase from EXAMPLE 20/LS1/BS1 with no PET04 with a contribution of 50% to a contribution of 71% with EXAMPLE 24/LS1/BS1 with 100% PET04.

The elasticity (Young's) modulus and yield stress of the biaxially stretched extrudates were measured for INVENTION EXAMPLES 21/LS1/BS1, 21/LS1/BS2 and 21/LS2/BS1 and the results are summarized in Table 23 below:

TABLE 23

| | Elasticity modulus [N/mm²] | | Yield stress [N/mm²] | |
|---|---|---|---|---|
| | longitudinal direction | transverse direction | longitudinal direction | transverse direction |
| 21/LS1/BS1 | 2908 | 4470 | 65.7 | 121 |
| 21/LS1/BS2 | 2594 | 3742 | 56.3 | 103.4 |
| 21/LS2/BS1 | 2965 | 4410 | 62.2 | 125.9 |

The presence of void-forming was demonstrated for the biaxially stretched film of EXAMPLE 20/LS1/BS1 by clamping the film in an Instron 4411 apparatus and observing the change in film thickness and optical density upon contacting the film with a soldering iron for 5 s at 150° C. The results of these experiments are given in Table 24.

TABLE 24

| Example nr. | before heating | | after heating at 150° C. for 5 s at pressure of 0.5 N/mm² | | Change | |
|---|---|---|---|---|---|---|
| | OD TR924 | thickness [μm] | OD (TR924) | thickness [μm] | ΔOD [%] | in thickness [μm] |
| 20/LS1/BS1 | 0.73 | 85 | 0.54 | 79 | 26 | 6 |

The results of Table 24 show that at approximately the same stretching temperature the contribution to the optical density of biaxially stretched films clearly increases as the concentration of PET04 in the composition increases i.e. the concentration of isophthalic acid units in the polyester increases to the concentration of 10 mole % of the aromatic dicarboxylic acid in PET04 itself.

The presence of void-forming was also demonstrated for the biaxially stretched films of EXAMPLES 23/LS1/BS1 and 24/LS1/BS1 by clamping the films in an Instron 4411 apparatus and observing the changes in film thickness and optical density upon contacting the film with a soldering iron for 5 s at various temperatures. The results of these experiments are given in Tables 25 and 26.

TABLE 25

| Example nr | OD before heating | OD (TR924) after heating for 5 s at a pressure of 0.5 N/mm² at | | | | | ΔOD at 150° C. | % decrease in OD |
|---|---|---|---|---|---|---|---|---|
| | | 122° C. | 130° C. | 150° C. | 170° C. | 190° C. | | |
| 23/LS1/BS1 | 1.10 | 0.84 | 0.83 | 0.68 | 0.62 | 0.57 | 0.42 | 38 |
| 24/LS1/BS1 | 1.19 | 0.86 | 0.78 | 0.60 | 0.50 | — | 0.60 | 50 |

TABLE 26

| Example nr | Layer thickness before heating [μm] | Layer thickness [μm] after heating for 5 s at a pressure of 0.5 N/mm² at | | | | |
|---|---|---|---|---|---|---|
| | | 122° C. | 130° C. | 150° C. | 170° C. | 190° C. |
| 23/LS1/BS1 | 125 | 117 | 117 | 113 | 106 | 84 |
| 24/LS1/BS1 | 100 | 94 | 88 | 81 | 73 | — |

Reductions in optical density at 150° C. of 0.19, 0.42, and 0.60 were observed for the films of EXAMPLE 20/LS1/BS1, 23/LS1/BS1 and 24/LS1/BS1 respectively corresponding to 26, 38, and 50%.

Examples 25 TO 27

The ca. 1100 μm thick extrudates of INVENTION EXAMPLES 25 to 27 of unpigmented dispersions of SAN 06 in aromatic polyester were produced as described for COMPARATIVE EXAMPLES 1 to 3 with different concentrations of SAN 06, PET02 and PET04 as summarized in Table 27.

TABLE 27

| Invention Example nr. | PET02 [% by wt] | PET04 [% by wt] | SAN 06 [% by wt] | Magnesium acetate [ppm] | UVITEX OB-one [ppm] |
|---|---|---|---|---|---|
| 25 | 57.7 | 25.3 | 17 | — | 100 |
| 26 | 25.3 | 57.7 | 17 | — | 100 |
| 27 | — | 85.0 | 15 | 33 | — |

Stretching in the length direction was carried out for each extrudate as described in COMPARATIVE EXAMPLES 1 to 3 under the conditions given in Table 28. The expected thickness is the thickness based on the extrudate thickness and longitudinal as observed for non-voided films.

TABLE 28

| Invention example nr | ratio | Longitudinal stretch | | Thickness | | OD TR924 | Expected OD | ΔOD | ΔOD/OD | OD [X-rite] |
|---|---|---|---|---|---|---|---|---|---|---|
| | | force [N/mm²] | Temperature [° C.] | Measured [μm] | Expected [μm] | | | | | |
| 25/LS1 | 3.8 | 8.21 | 175 | 301 | 289 | 0.80 | 0.05 | 0.75 | 0.94 | 0.47 |
| 25/LS2 | 3.6 | 8.65 | 142 | 320 | 305 | 0.72 | 0.05 | 0.67 | 0.93 | 0.47 |

TABLE 28-continued

| | Longitudinal stretch | | | Thickness | | | | | | |
|---|---|---|---|---|---|---|---|---|---|---|
| Invention example nr | ratio | force [N/mm²] | Temperature [° C.] | Measured [µm] | Expected [µm] | OD TR924 | Expected OD | ΔOD | ΔOD/OD | OD [X-rite] |
| 26/LS1 | 3.8 | 8.44 | 116 | 298 | 289 | 0.97 | 0.05 | 0.92 | 0.95 | 0.77 |
| 26/LS2 | 3.6 | 8.65 | 97 | 330 | 305 | 1.06 | 0.05 | 1.01 | 0.95 | 0.85 |
| 26/LS3 | 3.35 | 6.36 | 119 | 320 | 328 | 0.78 | 0.05 | 0.73 | 0.93 | 0.60 |
| 27/LS1 | 3.3 | 8.0 | 89 | | | 1.00 | 0.05 | 0.95 | 0.95 | |
| 27/LS2 | 3.3 | 9.5 | 80 | | | 1.14 | 0.05 | 1.09 | 0.96 | |

Transversal stretching was then performed on the length-stretched films with a stretch time of 30 s and stretching speed of 1000%/min under the conditions given in Table 29. The measured thickness, the expected thickness, i.e. thickness if no void-forming on the basis of the extrudate thickness and the longitudinal and transversal stretch ratios, the measured optical density with the MacBeth TR924 densitometer in transmission mode with a visible filter, the expected optical density, i.e. 0.05 the optical density of polyethylene terephthalate almost completely determined by refraction effects at the two sides of the film, and the difference between the observed optical density and the optical density expected due to the aromatic polyester, ΔOD, are also given in Table 29.

TABLE 29

| | Transverse stretch | | Thickness | | | | | |
|---|---|---|---|---|---|---|---|---|
| Invention example nr. | ratio | temperature [° C.] | Measured [µm] | Expected [µm] | OD TR924 | Expected OD | ΔOD | ΔOD/OD |
| 25/LS2/BS1 | 3.3 | 124 | 82 | 92 | 0.83 | 0.05 | 0.78 | 0.94 |
| 26/LS1/BS1 | 3.3 | 120 | 97 | 88 | 0.99 | 0.05 | 0.94 | 0.95 |
| 26/LS2/BS1 | 3.3 | 120 | 123 | 92 | 1.04 | 0.05 | 0.99 | 0.95 |
| 27/LS1/BS1 | 3.5 | 90 | 165 | 95 | 1.08 | 0.05 | 1.03 | 0.95 |
| 27/LS1/BS2 | 3.5 | 88 | 175 | 95 | 1.10 | 0.05 | 1.05 | 0.95 |
| 27/LS1/BS3 | 3.5 | 85 | 172 | 95 | 1.15 | 0.05 | 1.10 | 0.96 |
| 27/LS1/BS4 | 3.5 | 82 | 195 | 95 | 1.20 | 0.05 | 1.15 | 0.96 |
| 27/LS2/BS1 | 3.5 | 94 | 227 | 95 | 1.22 | 0.05 | 1.17 | 0.96 |
| 27/LS2/BS2 | 3.5 | 85 | 228 | 95 | 1.30 | 0.05 | 1.25 | 0.96 |
| 27/LS2/BS3 | 3.5 | 81 | 227 | 95 | 1.30 | 0.05 | 1.25 | 0.96 |
| 27/LS2/BS4 | 3.5 | 77 | 235 | 95 | 1.34 | 0.05 | 1.29 | 0.96 |
| 27/LS2/BS5 | 3.5 | 75 | 232 | 95 | 1.33 | 0.05 | 1.28 | 0.96 |

The results in Table 29 show strongly increased opacification optical densities of 1.28 and 1.29 due to void-forming for the films of INVENTION EXAMPLES 27/LS2/BS4 and 27/LS2/BS5 with a linear polyester matrix with 10 mole % isophthalate compared with an opacification optical density of 0.78 due to void forming for the film of INVENTION EXAMPLE 25/LS2/BS1 with a linear polyester matrix with 3 mole % isophthalate.

The presence of void-forming was demonstrated for the biaxially stretched films of EXAMPLES 25/LS2/BS1, 26/LS1/BS1 and 26/LS2/BS1 and the INVENTION EXAMPLE 27 series by clamping the films in an Instron 4411 apparatus and observing the changes in film thickness and optical density upon contacting the film with a soldering iron for 5 s at various temperatures. The results of these experiments are given in Tables 30 and 31.

TABLE 30

| Invention Example nr | OD before heating | OD (TR924) after heating for 5 s at a pressure of 0.5 N/mm² at | | | | | ΔOD at 170° C. | % decrease in OD |
|---|---|---|---|---|---|---|---|---|
| | | 122° C. | 130° C. | 150° C. | 170° C. | 190° C. | | |
| 25/LS2/BS1 | 0.83 | 0.45 | 0.38 | 0.19 | 0.16 | 0.18 | 0.67 | 81 |
| 26/LS1/BS1 | 0.99 | 0.49 | 0.42 | 0.22 | 0.14 | 0.13 | 0.85 | 86 |
| 26/LS2/BS1 | 1.04 | 0.67 | 0.44 | 0.22 | 0.16 | 0.13 | 0.88 | 85 |
| 27/LS1/BS1 | 1.10 | — | — | — | 0.23 | 0.17 | 0.87 | 79 |
| | 1.08 | | | | 0.17 | 0.14 | 0.91 | 84 |
| 27/LS1/BS2 | 1.11 | — | — | — | 0.18 | 0.17 | 0.93 | 84 |
| 27/LS1/BS3 | 1.12 | — | — | — | 0.25 | 0.19 | 0.87 | 78 |

TABLE 30-continued

| Invention Example nr | OD before heating | OD (TR924) after heating for 5 s at a pressure of 0.5 N/mm² at | | | | | ΔOD at 170° C. | % decrease in OD |
|---|---|---|---|---|---|---|---|---|
| | | 122° C. | 130° C. | 150° C. | 170° C. | 190° C. | | |
| 27/LS1/BS4 | 1.10 | — | — | — | 0.23 | 0.22 | 0.87 | 79 |
| 27/LS2/BS1 | 1.29 | — | — | — | 0.30 | 0.19 | 0.99 | 77 |
| 27/LS2/BS2 | 1.32 | — | — | — | 0.32 | 0.16 | 1.00 | 76 |
| | 1.12 | | | | 0.17 | 0.20 | 0.92 | 82 |
| 27/LS2/BS3 | 1.33 | — | — | — | 0.32 | 0.22 | 1.01 | 76 |
| 27/LS2/BS4 | 1.32 | — | — | — | 0.48 | 0.16 | 0.84 | 64 |
| 27/LS2/BS5 | 1.32 | — | — | — | 0.35 | — | 0.97 | 72 |

TABLE 31

| Invention Example nr | Film thickness before heating [μm] | Film thickness [μm] after heating for 5 s at a pressure of 0.5 N/mm² at | | | | | Δ thickness at 170° C. | % decrease in thickness |
|---|---|---|---|---|---|---|---|---|
| | | 122° C. | 130° C. | 150° C. | 170° C. | 190° C. | | |
| 25/LS2/BS1 | 82 | 83 | 80 | 74 | 71 | 76 | 11 | 13 |
| 26/LS1/BS1 | 97 | 97 | 91 | 87 | 81 | 67 | 16 | 16 |
| 26/LS2/BS1 | 123 | 118 | 114 | 105 | 99 | 74 | 24 | 19 |
| 27/LS1/BS1 | 164 | — | — | — | 118 | 118 | 46 | 28 |
| | 163 | | | | 122 | 98 | 41 | 25 |
| 27/LS1/BS2 | 170 | — | — | — | 121 | 91 | 49 | 29 |
| 27/LS1/BS3 | 158 | — | — | — | 119 | 101 | 39 | 25 |
| 27/LS1/BS4 | 194 | — | — | — | 140 | 140 | 54 | 28 |
| 27/LS2/BS1 | 209 | — | — | — | 142 | 135 | 67 | 32 |
| 27/LS2/BS2 | 220 | — | — | — | 141 | 104 | 79 | 36 |
| 27/LS2/BS3 | 216 | — | — | — | 138 | 111 | 78 | 36 |
| 27/LS2/BS4 | 219 | — | — | — | 148 | 92 | 71 | 32 |
| 27/LS2/BS5 | 216 | — | — | — | 139 | — | 77 | 36 |

A reduction in optical density at 190° C. of 0.67, 0.85 and 0.88 was observed for the films of INVENTION EXAMPLES 25/LS2/BS1, 26/LS1/BS1 and 26/LS2/BS1 respectively corresponding to 81, 86 and 85%. In the INVENTION EXAMPLE 27 series the reduction in optical density at 190° C. varied between 0.84 and 1.01 corresponding to 64 to 84%.

These reductions in optical density were accompanied by a reduction of 13, 16 and 19% in layer thickness with 25 to 36% reduction in thickness being observed for the INVENTION EXAMPLE 27 series. These results show an extremely large reduction in optical density of up to 1.01 upon transparentizing polyester layers with 15 or 17 wt % SAN 06.

Example 28 TO 34

The ca. 1100 μm thick extrudates of INVENTION EXAMPLES 28 to 34 with 2% by weight of titanium dioxide and 15% by weight of SAN 06 were produced as described for COMPARATIVE EXAMPLES 1 to 3 with different concentrations of PET02 and PET06 as summarized in Table 32.

TABLE 32

| Invention Example nr. | NP* [mol %] | PET02 [% by wt] | PET06 [% by wt] | SAN 06 [% by wt] | UVITEX OB-one [ppm] | TiO₂ [wt %] |
|---|---|---|---|---|---|---|
| 28 | 5.2 | 66.3 | 16.7 | 15 | 100 | 2.0 |
| 29 | 8.5 | 55.7 | 27.3 | 15 | 100 | 2.0 |
| 30 | 12.6 | 43.0 | 40.0 | 15 | 100 | 2.0 |
| 31 | 15.8 | 33.3 | 49.7 | 15 | — | 2.0 |
| 32 | 17.0 | 29.7 | 53.3 | 15 | 100 | 2.0 |
| 33 | 21.5 | 16.3 | 66.7 | 15 | — | 2.0 |
| 34 | 26.7 | 1.0 | 82.0 | 15 | — | 2.0 |

*NP = neopentylene monomer units in polyester

Stretching in the length direction was carried out for each extrudate as described in COMPARATIVE EXAMPLES 1 to 3 under the conditions given in Table 33. The expected thickness is the thickness based on the extrudate thickness and longitudinal as observed for non-voided films.

TABLE 33

| Example nr. | Longitudinal stretch | | | | Thickness | | OD TR924 | Expected OD | ΔOD | ΔOD/OD | OD [X-rite] |
|---|---|---|---|---|---|---|---|---|---|---|---|
| | ratio | force [N/mm²] | speed [m/min] | temperature [° C.] | Density [g/mL] | measured [μm] | expected [μm] | | | | |
| 28/BS1 | 3.3 | 9.55 | 4.0 | | | 387 | 333 | | | | | 0.84 |
| 29/BS1 | 3.3 | 9.55 | 4.0 | | | 366 | 333 | | | | | 0.82 |
| 30/BS1 | 3.3 | 8.27 | 4.0 | | | 366 | 333 | | | | | 0.77 |
| 31/BS1 | 3.3 | 8.0 | | 90 | 1.147 | 350 | 333 | 1.19 | 0.87 | 0.32 | 0.27 | 0.97 |
| 32/BS1 | 3.3 | 7.64 | 4.0 | | | 362 | 333 | | | | | 0.75 |
| 33/BS1 | 3.3 | 6.79 | 4.0 | | | 266 | 333 | | | | | 0.80 |

TABLE 33-continued

| | | Longitudinal stretch | | | | Thickness | | | | | | |
|---|---|---|---|---|---|---|---|---|---|---|---|---|
| Example nr. | ratio | force [N/mm²] | speed [m/min] | temperature [° C.] | Density [g/mL] | measured [μm] | expected [μm] | OD TR924 | Expected OD | ΔOD | ΔOD/OD | OD [X-rite] |
| 34/BS1 | 3.3 | 7.62 | 4.0 | | | 383 | 333 | | | | | 0.81 |
| 34/BS2 | 3.3 | 8.59 | 4.0 | | | 385 | 333 | | | | | 0.93 |

Transversal stretching was then performed on the length-stretched film with a stretch time of 30 s and stretching speed of 1000%/min under the conditions given in Table 34. The measured thickness, the expected thickness, i.e. thickness if no void-forming on the basis of the extrudate thickness and the longitudinal and transversal stretch ratios, the measured optical density with the MacBeth TR924 densitometer in transmission mode with a visible filter, the expected optical density and the difference between the observed optical density and the optical density expected due to the aromatic polyester, ΔOD, are also given in Table 34.

TABLE 34

| | Stretch | | | | Expected | | | | | |
|---|---|---|---|---|---|---|---|---|---|---|
| Example nr. | ratio | temperature [° C.] | Density [g/mL] | thickness [μm] | thickness [μm] | OD TR924 | Expected OD | ΔOD | ΔOD/OD | OD [X-rite] |
| 28/LS1/BS1 | 3.5 | 100 | 1.17 | 141 | 95 | | | | | 0.81 |
| 29/LS1/BS1 | 3.5 | 95 | 1.07 | 123 | 95 | | | | | 0.82 |
| 30/LS1/BS1 | 3.5 | 95 | 1.12 | 136 | 95 | | | | | 0.81 |
| 31/LS1/BS1 | 3.5 | 95 | 0.944 | 150 | 95 | 1.28 | 0.89 | 0.39 | 0.69 | 1.02 |
| 32/LS1/BS1 | 3.5 | 95 | 1.12 | 133 | 95 | | | | | 0.85 |
| 33/LS1/BS1 | 3.5 | 100 | 1.03 | 135 | 95 | | | | | 0.87 |
| 34/LS1/BS1 | 3.5 | 100 | 0.96 | 139 | 95 | | | | | 0.83 |
| 34/LS2/BS1 | 3.5 | 100 | | 147 | 95 | | | | | 0.98 |

The results in Table 34 clearly show very substantial opacification, 69% of the optical density realized being due to void-forming with a matrix of a blend of PET and PETG rather than PET or a blend of PET with a polyester of terephthalic acid, isophthalic acid and ethylene glycol such as PET03, PET04 and PET05.

The presence of void-forming was demonstrated for the biaxially stretched films of INVENTION EXAMPLES 28/LS1/BS1, 29/LS1/BS2, 30/LS1/BS1, 32/LS1/BS1 and 33/LS1/BS1 by clamping the films in an Instron 4411 apparatus and observing the changes in film thickness and optical density upon contacting the film with a soldering iron for 5 s at various temperatures. The results of these experiments are given in Table 35.

TABLE 35

| | | | after heating for 5 s at a pressure of 0.5 N/mm² | | | | | | | |
|---|---|---|---|---|---|---|---|---|---|---|
| | | | at 150° C. | | at 170° C. | | | | | |
| | Film thickness | OD | Film | | Film thickness | | | OD | | |
| Invention Example nr | before heating [μm] | before heating | thickness [μm] | OD | measured [μm] | Δ μm | % decrease | measured | Δ | % decrease |
| 28/LS1/BS1 | 129 | 0.992 | 114 | 0.638 | 108.3 | 20.7 | 16.0 | 0.579 | 0.413 | 41.6 |
| 29/LS1/BS2 | 119 | 1.09 | 103 | 0.662 | 95.7 | 23.3 | 19.6 | 0.551 | 0.539 | 49.4 |
| 30/LS1/BS1 | 134 | 1.1 | 106 | 0.582 | 101.7 | 32.3 | 24.1 | 0.510 | 0.59 | 53.6 |
| 32/LS1/BS1 | 121 | 1.07 | 102 | 0.608 | 88.7 | 32.3 | 26.7 | 0.537 | 0.533 | 49.8 |
| 33/LS1/BS1 | 111 | 1.06 | 76 | 0.455 | 58 | 53 | 47.7 | 0.406 | 0.654 | 61.7 |

A reduction in optical density at 170° C. varying from 0.413 for the film of INVENTION EXAMPLE 28/LS1/BS1 to 0.654 for the film of INVENTION EXAMPLE 33/LS1/BS1 corresponding to 41.6 to 61.7%. These reductions in optical density were accompanied by a reduction of 16 to 47.7% in layer thickness. These results show a large reduction in optical density of up to 0.654 upon transparentizing polyester layers with 15 wt % SAN 06 and 2 wt % TiO$_2$.

Example 35

The ca. 1100 µm thick extrudate of EXAMPLE 35 (SP54) with 2% by weight of titanium dioxide, 15% by weight of TPX® DX820, poly(4-methylpentene), 33.3% by weight of PET02 and 49.7% by weight of PET04 was produced as described for EXAMPLES 1 to 58. Stretching in the length direction was carried out for each extrudate as described in EXAMPLES 1 to 58 under the conditions given in Table 36. The expected thickness is the thickness based on the extrudate thickness and longitudinal as observed for non-voided films.

TABLE 36

| Example nr. | Longitudinal stretch | | | | Thickness | | OD TR924 | Expected OD | ΔOD | ΔOD/OD | OD [X-rite] |
|---|---|---|---|---|---|---|---|---|---|---|---|
| | Ratio | Force [N/mm$^2$] | Speed [m/min] | Density [g/mL] | Measured [µm] | Expected [µm] | | | | | |
| 35/BS1* | 3.3 | 5.21 | 4.0 | 1.147 | 500 | 333 | 1.10 | 0.87 | 0.23 | 0.21 | 0.96 |

Transversal stretching was then performed on the length-stretched film with a stretch time of 30 s and stretching speed of 1000%/min under the conditions given in Table 37. The measured thickness, the expected thickness, i.e. thickness if no void-forming on the basis of the extrudate thickness and the longitudinal and transversal stretch ratios, the measured optical density with the MacBeth TR924 densitometer in transmission mode with a visible filter, the expected optical density and the difference between the observed optical density and the optical density expected due to the aromatic polyester, ΔOD, are also given in Table 37.

TABLE 37

| Example nr. | Transversal stretch | | Density [g/mL] | Thickness | | OD TR924 | Expected OD | ΔOD | ΔOD/OD |
|---|---|---|---|---|---|---|---|---|---|
| | ratio | temperature [° C.] | | Measured [µm] | Expected [µm] | | | | |
| 35/LS1/BS1 | 3.5 | 100 | 0.64 | 270 | 95 | 1.08 | 0.39 | 0.69 | 0.64 |

The results in Table 37 clearly show very substantial opacification, 64% of the optical density realized being due to void-forming with a matrix of PET04 with TPX as crystalline dispersed phase with a particle size of ca. 10 µm. However, the elasticity (Young's) modulus in the longitudinal direction at 1258 N/mm$^2$ and the yield stress in the longitudinal direction at 26.4 N/mm$^2$ were substantially lower than for materials using SAN as opacity-producing agent, see results for INVENTION EXAMPLES 21/LS1/BS1, 21/LS1/BS2 and 21/LS2/BS1.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A non-transparent microvoided biaxially stretched self-supporting non-laminated polymeric film, the film comprising linear polyester as a continuous phase and dispersed uniformly therein an amorphous high polymer with a higher glass transition temperature than the glass transition temperature of said continuous phase which is non-crosslinked optionally with a crystalline high polymer having a higher melting point than the glass transition temperature of said continuous phase, wherein said linear polyester consists essentially of aromatic dicarboxylate and aliphatic dimethylene monomer units; said polymeric film has an optical density measured in transmission with a visible filter; and at least 50% of said optical density is due to microvoids.

2. The film according to claim 1, wherein the concentration of said uniformly dispersed amorphous high polymer or said crystalline high polymer in said film is 5 to 35% by weight.

3. The polymeric film according to claim 1, wherein said amorphous high polymer comprising at least one chain-polymerized block.

4. The polymeric film according to claim 3, wherein said at least one chain-polymerized block is selected from the group consisting of polystyrene, styrene copolymers, SAN-polymers, polyacrylates, acrylate-copolymers, polymethacrylates and methacrylate-copolymers.

5. The polymeric film according to claim 4, wherein said styrene copolymers are selected from the group consisting of SAN-polymers and ABS-polymers.

6. The film according to claim 5, wherein the concentration of AN-monomer units in said SAN-polymer is 15 to 35% by weight.

7. The film according to claim 5, wherein the weight ratio of said linear polyester to said SAN-polymer is in the range of 2.0:1 to 9.0:1.

8. The polymeric film according to claim 1, wherein said amorphous high polymer is exclusive of a cellulose ester.

9. The film according to claim 1, wherein said uniformly dispersed amorphous high polymer in said continuous phase is present as particles with a diameter of less than 10 μm.

10. The film according to claim 1, wherein said film further comprises at least one inorganic opacifying pigment.

11. The film according to claim 10, wherein said at least one inorganic opacifying pigment is selected from the group consisting of silica, zinc oxide, zinc sulphide, lithopone, barium sulphate, calcium carbonate, titanium dioxide, aluminium phosphate and clays.

12. The film according to claim 10, wherein said film comprises ≦5% by weight of inorganic opacifying pigment.

13. The film according to any one of claim 1, wherein said aromatic dicarboxylate monomer units are selected from the group consisting of terephthalate, isophthalate and naphthalene dicarboxylates.

14. The film according to claim 1, wherein said aliphatic dimethylene monomer units are selected from the group consisting of ethylene, diethylene ether, tetramethylene, neopentylene and 1,4-cyclohexanedimethylene.

15. The film according to claim 1, wherein 30 mole % or less of said aromatic dicarboxylate monomer units in said linear polyester are isophthalate monomer units.

16. The film according to claim 1, wherein at least 3 mole % of said aromatic dicarboxylate monomer units in said linear polyester are isophthalate monomer units.

17. The film according to claim 1, wherein said linear polyester comprises at least one linear aromatic polyester resin.

18. The film according to claim 17, wherein said at least one of said at least one linear aromatic polyester resins has an inherent viscosity determined in a 0.5 g/dL solution of 60 wt% phenol and 40 wt% ortho-dichloro-benzene at 25° C. of at least 0.45 dl/g.

19. The film according to claim 1, wherein said film further comprises an ingredient selected from the group consisting of whitening agents, UV-absorbers, light stabilizers, antioxidants, flame retardants and colorants.

20. The film according to claim 1, wherein said film has a density of 1.2 g/mL or less.

21. A process for providing prints on a printing medium comprising the steps of: (a) providing a printing apparatus; (b) providing a non-transparent microvoided biaxially stretched self-supporting non-laminated polymeric film as the printing medium, the film comprising linear polyester as a continuous phase and dispersed uniformly therein an amorphous high polymer with a higher glass transition temperature than the glass transition temperature of said continuous phase which is non-crosslinked optionally with a crystalline high polymer having a higher melting point than the glass transition temperature of said continuous phase, wherein said linear polyester consists essentially of aromatic dicarboxylate and aliphatic dimethylene monomer units; said polymeric film has an optical density measured in transmission with a visible filter; and at least 50% of said optical density is due to microvoids; and (c) realizing prints on the printing medium with the printing apparatus.

22. An image recording element comprising a non-transparent microvoided biaxially stretched self-supporting non-laminated polymeric film, the film comprising linear polyester as a continuous phase and dispersed uniformly therein an amorphous high polymer with a higher glass transition temperature than the glass transition temperature of said continuous phase which is non-crosslinked optionally with a crystalline high polymer having a higher melting point than the glass transition temperature of said continuous phase, wherein said linear polyester consists essentially of aromatic dicarboxylate and aliphatic dimethylene monomer units; said polymeric film has an optical density measured in transmission with a visible filter; and at least 50% of said optical density is due to microvoids.

23. The image recording element according to claim 22, wherein said film is provided on at least one side with a transparent overprintable layer.

24. The image recording element according to claim 22, wherein said film is provided on at least one side with a non-transparent transparentizable overprintable layer.

25. The image recording element according to claim 22, wherein said film is provided on at least one side with an ink-jet receiving layer.

26. The image recording element according to claim 22, wherein said film is provided on at least one side with an imaging layer.

27. The image recording element according to claims 22, wherein said film is provided with a writable layer.

28. A process for obtaining a transparent pattern comprising the step of: image-wise application of heat optionally supplemented by the application of pressure to a non-transparent microvoided biaxially stretched self-supporting non-laminated polymeric film, the film comprising linear polyester as a continuous phase and dispersed uniformly therein an amorphous high polymer with a higher glass transition temperature than the glass transition temperature of said continuous phase and/or a crystalline high polymer having a higher melting point than the glass transition temperature of said continuous phase, wherein said linear polyester consists essentially of aromatic dicarboxylate and aliphatic dimethylene monomer units; said polymeric film has an optical density measured in transmission with a visible filter; and at least 50% of said optical density is due to microvoids.

* * * * *